United States Patent
Lazier et al.

(10) Patent No.: US 10,055,451 B2
(45) Date of Patent: Aug. 21, 2018

(54) OBJECT LOSS REPORTING IN A DATA STORAGE SYSTEM

(71) Applicant: Amazon Technologies, Inc., Reno, NV (US)

(72) Inventors: Colin Laird Lazier, Seattle, WA (US); Brian J. Deen, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 169 days.

(21) Appl. No.: 14/595,020

(22) Filed: Jan. 12, 2015

(65) Prior Publication Data

US 2015/0127620 A1 May 7, 2015

Related U.S. Application Data

(63) Continuation of application No. 13/558,070, filed on Jul. 25, 2012, now Pat. No. 8,935,221.

(51) Int. Cl.
*G06F 17/30* (2006.01)
*G06F 11/00* (2006.01)
*G06F 11/14* (2006.01)

(52) U.S. Cl.
CPC ........ *G06F 17/30386* (2013.01); *G06F 11/00* (2013.01); *G06F 11/14* (2013.01); *G06F 17/30303* (2013.01)

(58) Field of Classification Search
None
See application file for complete search history.

(56) References Cited

U.S. PATENT DOCUMENTS

| | | | |
|---|---|---|---|
| 7,647,329 B1 | 1/2010 | Fischman et al. | |
| 7,716,180 B2 | 5/2010 | Vermeulen et al. | |
| 8,935,221 B1 | 1/2015 | Lazier et al. | |
| 2002/0069245 A1 | 6/2002 | Kim | |
| 2004/0255140 A1 | 12/2004 | Margolus et al. | |
| 2006/0069884 A1 | 3/2006 | Kim et al. | |

(Continued)

OTHER PUBLICATIONS

PUT Object date Mar. 1, 2006 [accessed on Jan. 26, 2017], Amazon.com, http://docs.aws.amazon.com/AmazonS3/latest/API/RESTObjectPUT.html.*

(Continued)

*Primary Examiner* — Jason G Liao
(74) *Attorney, Agent, or Firm* — Robert C. Kowert; Meyertons, Hood, Kivlin, Kowert & Goetzel, P.C.

(57) ABSTRACT

In response to receiving a request from a client to store an object, a key-durable storage system may assign the object to a volume in its data store, generate a key for the object (e.g., an opaque identifier that encodes information for locating the object in the data store), store the object on one disk in the assigned volume, store the key redundantly in the assigned volume (e.g., using a replication or erasure coding technique), and may return the key to the client. To retrieve the object, the client may send a request including the key, and the system may return the object to the client. If a disk fails, the system may determine which objects were lost, and may return the corresponding keys to the appropriate clients in a notification. The system may be used to back up a more expensive object-redundant storage system.

20 Claims, 11 Drawing Sheets

(56) References Cited

U.S. PATENT DOCUMENTS

| | | |
|---|---|---|
| 2009/0204859 A1 | 8/2009 | Cousins |
| 2010/0199123 A1 | 8/2010 | Cohen |
| 2011/0126026 A1 | 5/2011 | Gladwin et al. |
| 2011/0286595 A1 | 11/2011 | Resch et al. |
| 2012/0023385 A1 | 1/2012 | Scouarnec et al. |
| 2012/0060072 A1 | 3/2012 | Simitci et al. |

OTHER PUBLICATIONS

"Data Structure", Foldoc, Sep. 11, 2003, 1 page.
"Erasure Coding vs. Replication: A Quantitative Comparison", Hakim Weatherspoon and John D. Kubiatowicz, 2002, pp. 1-6.
Kim et al., Low-Level Communication Layers and Device Employing Same Jul. 22, 2004, Unpublished by USPTO, U.S. Appl. No. 60/590,722.

* cited by examiner

OBJECT LOSS REPORTING IN A DATA STORAGE SYSTEM

This application is a continuation of U.S. patent application Ser. No. 13/558,070, filed Jul. 25, 2012, now U.S. Pat. No. 8,935,221, which is hereby incorporated by reference in its entirety.

BACKGROUND

The conventional Web model allows clients to access Web resources (e.g., applications, services and data) via an HTTP client program, such as a Web browser. A technology referred to as Web services has been developed to provide programmatic access to Web resources. Web services may be used to provide programmatic access to Web resources including technology platforms (e.g., applications and services) and data (e.g., product catalogs and other databases) hosted on Web-connected computers such as Web server systems via a Web service interface. Generally speaking, a Web service interface may be configured to provide a standard, cross-platform API (Application Programming Interface) for communication between a client requesting some service to be performed and the service provider. In some implementations, a Web service interface may be configured to support the exchange of documents or messages including information describing the service request and response to that request. Such documents, or messages, may be exchanged using standardized Web protocols, such as the Hypertext Transfer Protocol (HTTP), for example, and may be formatted in a platform-independent data format, such as eXtensible Markup Language (XML), for example.

One example of a service that is provided to clients via a Web service interface is a data storage service. A typical data storage service (which may be referred to herein as an "object-redundant storage system") may receive requests to store data objects on behalf of storage service clients, and may store those data objects using redundancy in order to provide a high level of durability for the stored data. For example, such a data storage service may replicate the objects it stores across different storage nodes to increase the likelihood that object data will survive the failure of any given storage node. In such systems, until a certain minimum number of replicas (e.g., two or three) of an object have been successfully written the write operation may not be considered to be completed. However, for a given object, the actual number of valid replicas (or instances) of that object might at some points in time be less than the target number, for a variety of reasons, and a replacement process may be invoked to correct the situation. For example, if a previously valid replica becomes inaccessible due to a failure of the device on which it was stored, the failed device may be replaced in the system, and another instance of the replica may be written to the replacement device. In some systems, each replica need not correspond to an exact copy of the object data. For example, in some object-redundant storage systems, an object may be divided into a number of portions or "shards" according to a redundant encoding scheme (such as a parity, error correction code or other scheme), such that the object data may be recreated from fewer than all of the generated portions. Typically, object-redundant storage systems may be optimized for performance characteristics, such as latency, throughput or availability.

Some object-redundant storage systems maintain multiple keymap instances, each of which provides records of the relationships between keys of objects (i.e., keys specified by clients or generated based on client-specified identifiers or other parameter values for the objects) and locators of particular instances or replicas of those objects. In storing such records, keymap instances also reflect the degree to which the objects are replicated within the storage system (e.g., how many instances of an object exist, and how they may be referenced). Multiple storage nodes may provide storage for individual instances of objects as identified by their locator, and the keymap instances must be continuously updated to reflect changes in the number, states and/or locations of those object instances. Object-redundant storage systems may also be responsible for synchronizing multiple replicas of a stored object if and when the object is updated.

Figure 1:
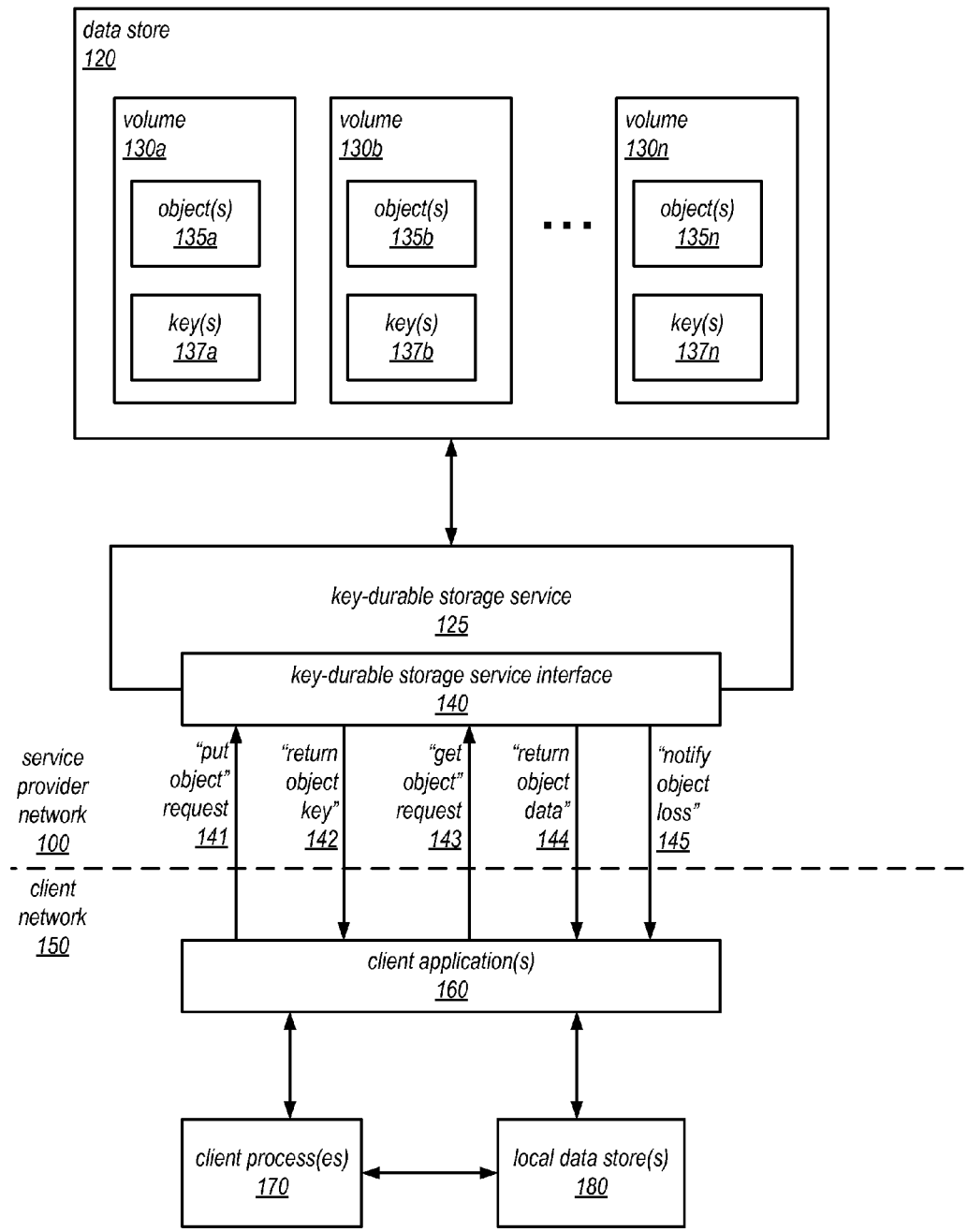
FIG. 1 is a block diagram illustrating a system that implements a key-durable storage service, according to some embodiments.

While embodiments described herein by way of example for several embodiments and illustrative drawings, those skilled in the art will recognize that the embodiments not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

In some cases, storage service clients may be more concerned about data storage costs than they are about performance-related parameters such as latency, throughput or availability. For example, a client may be willing to trade away some or all of these performance constraints to achieve a more cost-effective storage solution for archival storage, where the data should be stored with some durably, and will be stored for a long time, but it is not going to be accessed very often (if at all). The systems and methods described herein may provide a storage service that is well suited for such storage models, and for other storage models in which the storage service does not store the only instances of the stored data, or in which the storage service does not need to maintain a complex mapping of client keys for redundantly stored objects (e.g., because the client assumes this responsibility). The storage services described herein as "key-durable storage services" may in some embodiments provide very low cost storage with granular failure detection, and may be offered to storage service clients as a web-based service. These services may in some embodiments be used to build highly durable storage solutions on top of lower cost infrastructures (e.g., the key-durable storage systems described herein). Note that in the descriptions that follow, the terms "key-durable storage service" and "key-durable storage system" may be used somewhat interchangeably to refer to the functionality provided by a key-durable storage service or to an underlying computing system (and/or various components thereof) that is configured to implement that functionality.

The key-durable storage services described herein may differ from other available storage services in several ways. For example, instead of relying on a high level of redundancy for the objects they store on behalf of clients (e.g., through replication, parity, erasure coding, or other error correction techniques), they may implement little or no redundancy for stored objects. However, they may implement some amount of redundancy for keys for those objects, which may allow the key-durable storage systems to provide failure detection (e.g., in the case that a storage node is damaged, compromised or corrupted, that it has gone offline, or that it has otherwise failed in a manner in which there is at least the potential that data stored on the disk has been lost).

In some embodiments, a key-durable storage service (or an underlying key-durable storage system) may generate a key for each object that it stores, rather than employing a client-specified key to identify the object (or any replicas thereof) in the storage system. The key generated by the key-durable storage system may include an encoding that allows the key-durable storage service to locate the stored object when a request to retrieve it is received. For example, the system generated key may include encrypted information that identifies the storage volume or disk on which the object is stored in the system by the service. Each object stored by the key-durable storage service may be treated as an individual, independently stored object with its own key, regardless of whether any objects received from a client for storage are related to each other (e.g., regardless of whether they are replicas or shards of an object used in a client application, or share any identifying or classification parameter values from the client's perspective). The system-generated keys may be stored alongside the object data, in some embodiments.

As noted above, the key-durable storage systems described herein may not maintain a mapping of client keys for redundantly stored objects (e.g., a keymap), leaving this responsibility to storage service clients. However, in some storage models in which the responsibility for managing object redundancy and maintaining a mapping of keys, objects, and locations is left to the client, there may be a requirement that the client is to be notified upon the loss of any object stored in the key-durable storage system (e.g., identifying the lost object by its system-generated key). For example, in some embodiments, if a disk in the key-durable storage system fails and all of the objects stored on that disk are lost, the key-durable storage system may be configured to notify the clients on whose behalf the lost objects were stored of the keys of the objects that were lost.

In some embodiments, the key-durable storage systems described herein may define a set of disks that are considered to be a "volume" (e.g., a logical or virtual volume) in the key-durable storage system. In such embodiments, when an object is received for storing in the system, it may be assigned to one such volume, and a write may be performed to every member in that volume. However, instead of writing a replica or shard of the object to each member of the volume (as would be the case in an object-redundant storage system), the actual data payload (i.e., the data for the object itself) may be written to only one member of the volume, while the system-generated key for the object may be written to two or more (or all) of the members of the volume (which may or may not include the disk on which the object was stored). If a disk of a volume fails, it may be repaired or replaced, and/or disks can be added to the set, if needed. In some embodiments, replicas of the system generated key may be stored in multiple volume members, while in other embodiments a technique such as erasure coding may be applied to the key (with the resulting shards being stored on different members of the volume) for additional space savings, if desired. Note that in embodiments that employ such volumes, the key-durable storage system has the property that objects are stored with a stretch factor approaching 1.0 (i.e., no additional data) as object sizes get larger.

As described in more detail herein, the durability of the keys in a key-durable storage system may be handled separately from the durability of the data. For example, the keys may be stored in the system according to a key durability policy that specifies a higher durability than a corresponding object durability policy according to which objects are stored in the system. In embodiments that employ the volumes described above, the durability of the keys may be determined by the number of members in the set (or, conversely, the number of members in the set may be selected such that a desired durability of the keys is achieved). In some embodiments, when a member of the set is lost, some number of objects may be lost (e.g., any objects that were stored only on the lost disk). In some embodiments, the key-durable storage service may interrogate the other members of the set to determine what keys exist in the volume that have no corresponding object. The service may then notify the appropriate client, indicating the keys of the objects that have been lost, and the client can then take appropriate action.

FIG. 1 is a block diagram illustrating a system that implements a key-durable storage service, according to some embodiments. In this example, the system includes a client network 150 in which one or more client application(s) 160 leverage a key-durable storage service 125 and APIs 141-145 of a key-durable storage service interface 140 to the service on a service provider network 100 to perform storage functions on a remote data store 120 on the service provider network 100, according to at least some embodiments. The key-durable storage service 125 and APIs 141-145 may provide a standard interface to the remote data store 120 on the service provider network 100 through key-durable storage service interface 140. The APIs 141-145 to the service may expose functionality of the key-durable storage provided on remote data store 120 to service clients. The key-durable storage service 125 may, for example, be implemented on a data plane of the service provider network 100 comprising one or more network devices such as servers.

The service provider, a service client and/or a third party may develop applications or appliances (e.g., client application(s) 160) that may, for example, execute on a client network 150 and that leverage the APIs 141-145 to take advantage of the key-durable storage on remote data store 120. For example, a client application may perform functions such as uploading or retrieving data from remote data store 120 through these APIs, or may perform various data recovery functions in response to receiving a notification of a data loss through one of these APIs. In this example, the local storage on client network 150 (e.g., one or more local data stores 180) may be any type of storage system or storage device, and may serve as a data source or a data destination. In some embodiments, local data stores 180 and client applications 160 and/or client processes 170 may implement a data storage service of any of a variety of types. For example, in some embodiments, local data stores 180 and client applications 160 and/or client processes 170 may implement a storage service that provides highly-durable storage for object data, such as one that relies on replication and/or erasure coding of the object data, or another redundancy-based durability scheme when storing object data on behalf of storage service clients. As previously noted, such storage systems may sometimes be referred to herein as "object-redundant storage systems". By contrast, key-durable storage service 125 may store objects on behalf of clients in data store 120 in a non-redundant manner (or with very little redundancy), but may provide high durability for system-generated keys for those stored objects (e.g., through the application of various types of redundancy schemes). In other words, the durability provided for the keys may be different from (e.g., higher than) the durability provided for the stored objects themselves. This may allow key-durable storage service 125 to provide a cost-effective storage solution for clients who are not accessing the objects stored by the service often, who are managing and storing the objects with higher redundancy elsewhere, and/or who can recover from a data loss by key-durable storage service 125 as long as they are informed of the loss of any particular stored object(s).

As illustrated in FIG. 1, key-durable storage service 125 may store objects on behalf of storage service clients in a data store 120 that is based on virtual or logical volumes, such as volumes 130*a*-130*n*. Each of these volumes may store multiple objects 135 and multiple keys 137, illustrated in FIG. 1 as collections of objects 135*a*-135*n* and collections of keys 137*a*-137*n*. As previously noted, each of these keys may be a system-generated key that includes encrypted information that enables the key-durable storage service to retrieve the object data corresponding to that key. For example, the keys may encode information indicating where the object is stored (e.g., its assigned volume and/or disk) and an identifier of the object (which may be unique within the data managed by key-durable storage service 125, within data store 120 or a particular data storage center, or within the object's assigned volume, in some embodiments).

Figure 7A:
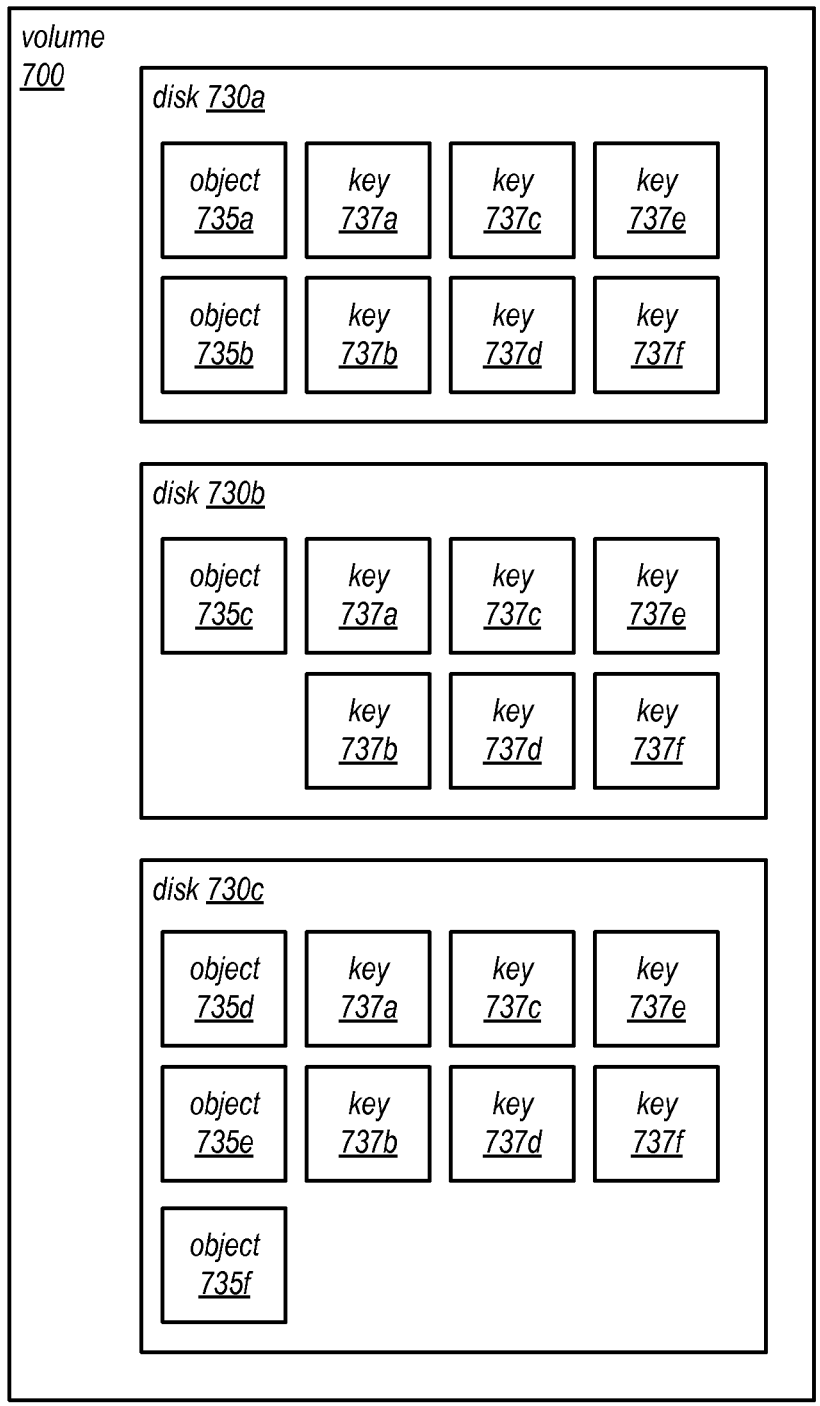
FIGS. 7A and 7B are block diagrams illustrating the distribution of objects and corresponding keys that are stored on the disks of a given storage volume by a key-durable storage service, according to different embodiments.
Figure 7B:
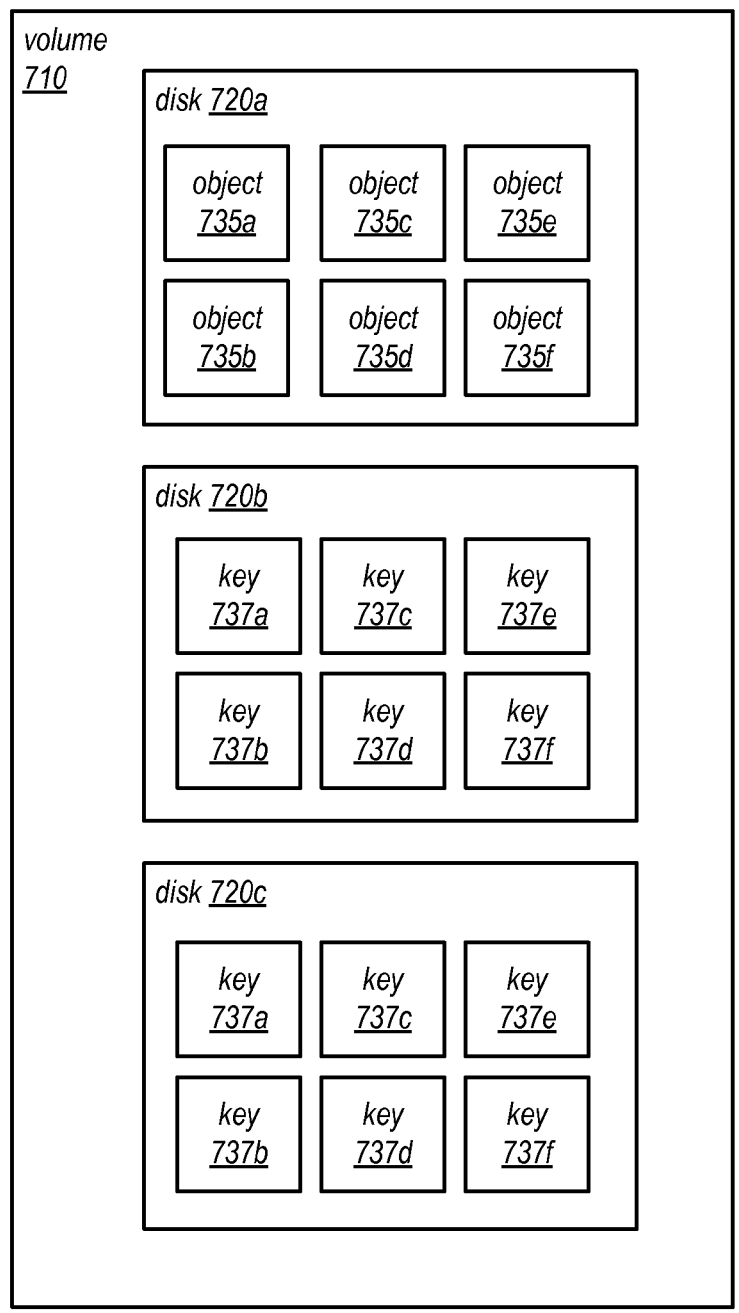

In some embodiments, each object stored in data store 120 by key-durable storage service 125 may be assigned to a particular volume 130 for storage. In some embodiments, each volume in data store 120 may be defined as containing a particular set of disks. As described in more detail herein, the service may provide higher durability for the keys 137 than for the objects 135. For example, object data for a stored object may only be stored on a single disk in its assigned volume, while a system-generated key for the object may be stored on multiple disks of the volume. The number of disks in the set may determine the durability of the keys, and may be selected based the desired durability for the keys. Various examples of how objects and corresponding keys may be stored in volumes and distributed across the disks of those volumes are illustrated in FIGS. 7A-7B and described below.

Note that in various embodiments, the API calls and responses between client application(s) 160 and key-durable storage service APIs 141-145 in FIG. 1 may be performed over a secure proxy connection (e.g., one managed by a gateway control plane), or may be performed over the public network or, alternatively, over a private channel such as a virtual private network (VPN) connection. A wide variety of applications 160 may be developed using the APIs 141-145. As an example, a service client or third party may develop a relatively simple application that copies each object in a data set from a data source such as local data stores 180 (e.g., a tape, a disk, a storage system, etc.) to a remote data store 120 according to a "put object" API (shown as 141) and a corresponding "return object key" API (shown as 142). In this example, the stored objects may be retrieved from data store 120 according to a "get object" API (shown as 143) and a corresponding "return object data" API (shown as 144). In another example, a third party storage device provider may develop cloud technology-backed devices, for example Storage Area Network (SAN) storage devices and Network-Attached Storage (NAS) devices, that upload data to and download data from "cloud" storage (remote data store 120) provided by the service provider network 100 via the APIs 141-145. As described in more detail below, key-durable storage service 125 may notify client applications 160 when object data that was stored by them on data store 120 has been lost through a "notify object loss" API (shown as 145).

In some embodiments, the APIs provided by key-durable storage service 125 may include more, fewer, or different APIs for invoking or receiving responses to storage-related operations or other operations. For example, in some embodiments, the APIs for the key-durable storage systems described herein may include a "delete object" API that includes the system-generated key of an object as an input parameter. In such embodiments, in response to receiving a request to delete an object according to this API, the key-durable storage system may locate the object in its data store (e.g., using information encoded in the key) and may delete it from the volume and disk on which it is stored. In some such embodiments, the corresponding keys (e.g., those stored on the same disk as the object and/or on one or more other disks in the same volume) may also be deleted. In other embodiments, the APIs for the key-durable storage systems described herein may include APIs for use in performance monitoring, metrics collection, state gathering, or various other system-level functions.

As indicated by the line from client process(es) 170 to client application(s) 160 in FIG. 1, client process(es) 170 may (in some embodiments) interface with a client application 160. As indicated by the line from client process(es) 170 to local data store 180, client process(es) 170 may (in some embodiments) access local data store 180 through other interfaces or methods instead of or in addition to via the client application(s) 160. Several use cases and other examples of applications 160 that may leverage the APIs 141-145 are described herein.

The example set of functions for the storage described above may be provided by the key-durable storage service 125 and exposed to service clients or other entities via the APIs 141-145 to the key-durable storage service 125, according to at least some embodiments. The example set of functions described herein is not intended to be limiting. These and other APIs to the key-durable storage service 125 may be implemented according to different technologies, including, but not limited to, Simple Object Access Protocol (SOAP) technology and Representational state transfer (REST) technology. In other words, the APIs to the key-durable storage service 125 may be, but are not necessarily, implemented as SOAP APIs or RESTful APIs. SOAP is a protocol for exchanging information in the context of Web-based services. REST is an architecture for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with the key-durable storage service 125. Examples of the functions invoked by each of these APIs are described in more detail below.

Figure 2:
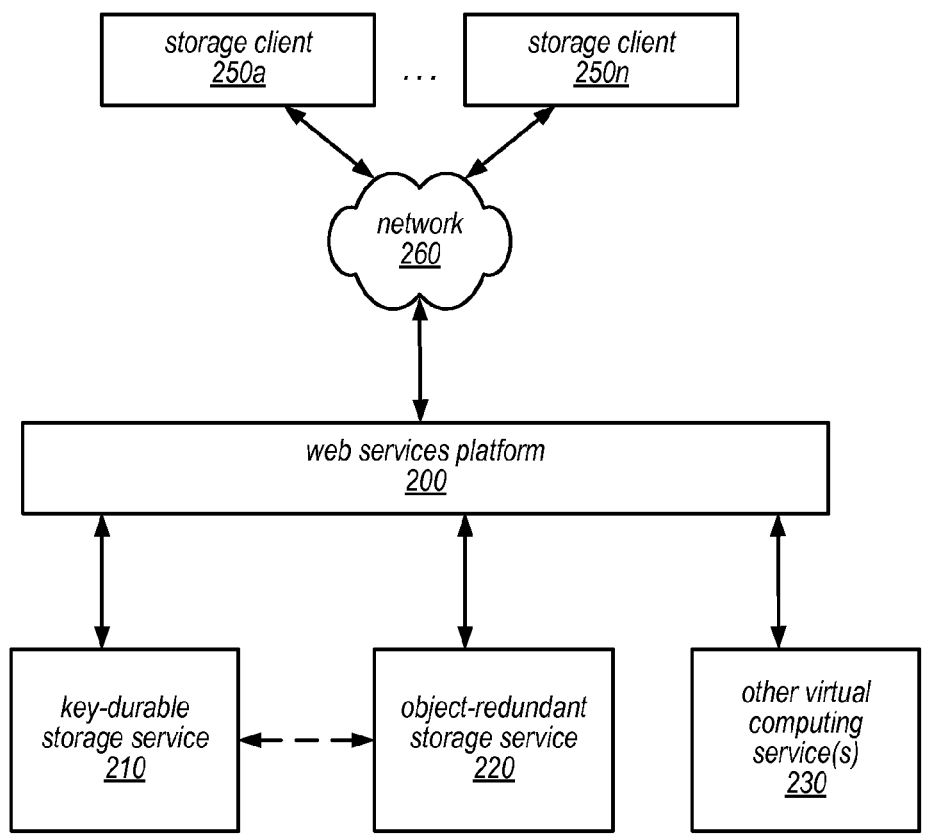
FIG. 2 is a block diagram illustrating a service system architecture that may be configured to implement a web services-based key-durable storage service, according to some embodiments.

One embodiment of a service system architecture that may be configured to implement a web services-based storage service such as that illustrated in FIG. 1 is shown in FIG. 2. In the illustrated embodiment, a number of clients (shown as storage clients 250a-250n) may be configured to interact with a web services platform 200 via a network 260. Web services platform 200 may be configured to interface with one or more instances of a key-durable storage service 210, an object-redundant storage service 220 and/or a virtual computing service 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a distributed system including a number of computing nodes (or simply, nodes), such as the computer system embodiment shown in FIG. 10 and discussed below. In various embodiments, the functionality of a given service system component (e.g., a storage service system component) may be implemented by a particular node or distributed across several nodes. In some embodiments, a given node may implement the functionality of more than one service system component (e.g., more than one storage service system component).

Generally speaking, clients 250 may encompass any type of client configurable to submit web services requests to web services platform 200 via network 260, including requests for storage services. For example, a given client 250 may include a suitable version of a web browser, or a plugin module or other type of code module configured to execute as an extension to or within an execution environment provided by a web browser. Alternatively, a client 250 (e.g., a storage service client) may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, client 250 may be an application configured to interact directly with web services platform 200. As described herein, client 250 may be configured to generate web services requests according to a Representational State Transfer (REST)-style web services architecture, a document- or message-based web services architecture, or another suitable web services architecture.

In other embodiments, a client 250 (e.g., a storage service client) may be configured to provide access to web services-based storage to other applications in a manner that is transparent to those applications. For example, client 250 may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, applications may not need to be modified to make use of the storage system service model of FIG. 1. Instead, the details of interfacing to Web services platform 200 may be coordinated by client 250 and the operating system or file system on behalf of applications executing within the operating system environment.

Clients 250 may convey web services requests to and receive responses from web services platform 200 via network 260. In various embodiments, network 260 may encompass any suitable combination of networking hardware and protocols necessary to establish web-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and web services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and web services platform 200. It is noted that in some embodiments, clients 250 may communicate with web services platform 200 using a private network rather than the public Internet. For example, clients 250 may be provisioned within the same enterprise as a storage service system (e.g., a system that implements key-durable storage service 210 and/or object-redundant storage service 220). In such a case, clients 250 may communicate with platform 200 entirely through a private network 260 (e.g., a LAN or WAN that may use Internet-based communication protocols but which is not publicly accessible).

Generally speaking, web services platform 200 may be configured to implement one or more service endpoints configured to receive and process web services requests, such as requests to access objects 135 stored by a key-durable storage service (or the underlying storage system that implements such a service). For example, web services platform 200 may include hardware and/or software configured to implement an particular endpoint, such that an HTTP-based web services request directed to that endpoint is properly received and processed. In one embodiment, web services platform 200 may be implemented as a server system configured to receive web services requests from clients 250 and to forward them to components of a system that implements key-durable storage service 210, object-redundant storage service 220 and/or another virtual computing service 230 for processing. In other embodiments, web services platform 200 may be configured as a number of distinct systems (e.g., in a cluster topology) implementing load balancing and other request management features configured to dynamically manage large-scale web services request processing loads. In various embodiments, web services platform 200 may be configured to support REST-style or document-based (e.g., SOAP-based) types of web services requests.

In addition to functioning as an addressable endpoint for clients' web services requests, in some embodiments web services platform 200 may implement various client management features. For example, platform 200 may coordinate the metering and accounting of client usage of web services, including storage resources, such as by tracking the identities of requesting clients 250, the number and/or frequency of client requests, the size of objects 135 stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of requested objects 135 (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of key-durable storage services 210, object-redundant storage service 220 and/or another virtual computing service 230 (or the underlying systems that implement those services).

In some embodiments, platform 200 may also implement user authentication and access control procedures. For example, for a given web services request to access a particular object 135 associated with a given key 137, platform 200 may be configured to ascertain whether the client 250 associated with the request is authorized to access the particular object 135. Platform 200 may determine such authorization by, for example, evaluating an identity, password or other credential against credentials associated with the particular object 135, or evaluating the requested access to particular object 135 against an access control list for particular object 135. For example, if a client 250 does not have sufficient credentials to retrieve the particular object 135, platform 200 may reject the corresponding web services request, for example by returning a response to the requesting client 250 indicating an error condition. Various access control policies may be stored as records or lists of access control information by key-durable storage service 210, object-redundant storage service 220 and/or other virtual computing services 230.

While in some embodiments, a storage service system that implements a key-durable storage service (such as key-durable storage service 210 of FIG. 2 or key-durable storage service 125 of FIG. 1) may support objects 135 of arbitrary sizes, in other embodiments objects 135 may be constrained to a certain maximum size, also referred to as a chunk size. In some such embodiments, when a client provides an object to be stored by key-durable storage service 210 and the object exceeds the chunk size, platform 200 may be configured to divide the object into two or more chunks according to the chunk size. In one embodiment, platform 200 may be configured to store each chunk as a respective object 135 having an associated key value. In other words, platform 200 may generate separate key values for each chunk. In other embodiments, when a client provides an object to be stored by key-durable storage service 210 and the object exceeds the chunk size, platform 200 may be configured to return a response to the requesting client 250 indicating an error condition.

It is also noted that while web services platform 200 may represent the primary interface through which clients 250 may access the features of a storage system that implements key-durable storage service 210, it need not represent the sole interface to such features. For example, an alternate API that may be distinct from a web services interface may be used to allow clients internal to the enterprise providing the storage service system to bypass web services platform 200. As illustrated by the dashed line between key-durable storage service 210 and object-redundant storage service 220 in FIG. 2, two different storage services may be configured to bypass web services platform 200 and to implement an API directly between the two underlying systems (e.g., if key-durable storage service 210 and object-redundant storage service 220 are configured to work together to provide a cost-efficient but highly durable storage solution for clients). Examples of the use of such configurations are described in more detail below. In another example (not shown) a virtual computing service 230 may configured to bypass web services platform 200 and to implement an API directly between the virtual computing service 230 and a storage system (e.g., key-durable storage service 210 and/or object-redundant storage service 220) to store objects used in performing computing services 230 on behalf of a client 250. In some cases, the accounting and/or credentialing services of platform 200 may be unnecessary for internal clients such as administrative clients or between service components within the same enterprise.

Note that in various embodiments, different storage policies may be implemented by key-durable storage service 210 and object-redundant storage service 220. Examples of such storage policies may include durability policy (e.g., a policy indicating the number of instances of an object 135 or a key 137 that will be stored and the number of different nodes on which they will be stored), a locality policy (e.g., a policy giving preference to storage nodes in a same region or area as a client) and/or a load balancing policy (which may distribute stored objects and keys across different nodes, volumes and/or disks in an attempt to equalize request traffic). For example, in some embodiments, a key-durable storage service 210 may implement a lower-durability storage policy for objects 135 than is implemented in an object-redundant storage service 220. In addition, different storage policies may be applied to different items by one of the storage services. For example, in some embodiments, a key-durable storage service 210 may implement a higher durability for keys 137 than for objects 135.

Note that while several examples included herein describe a key-durable storage service as a Web-based service exposed to storage service clients, in other embodiments, the key-durable storage service may be internal to a computing system or an enterprise system and may not be exposed to external clients (e.g., users or client applications). For example, a client may store objects to a primary storage service (a storage service other than a key-durable storage service), and the primary storage service or an operating system (or another system component) may cause the object (or a replica or shard thereof) to be stored to a key-durable storage service instead of or in addition to storing the object to the primary storage service. In another example, the operating system, a backup process, or another system component may back up a primary storage system (e.g., periodically, automatically or in response to a request to do so) to a key-durable storage system. In these examples, the "client" of key-durable storage service 210 may be an object-redundant storage service (such as object-redundant storage service 220 illustrated in FIG. 2) or another application internal to a web services platform (such as virtual computing service 230 illustrated in FIG. 2). In such embodiments, the client may access key-redundant storage system 210 over a local or private network, rather than over the Internet.

As noted above, the key-durable storage system may not maintain a data structure that maps the data objects it stores or their respective keys to the locations of the data objects in its data store (e.g., a keymap). This may allow the key-durable storage system to be less complex (and correspondingly, less expensive to build and maintain) than storage systems in which such indexing must be provided by the storage service itself. The key-durable storage service may leave this responsibility to its clients, who may manage and maintain objects and/or key using some advanced indexing functionality that complements the key-durable storage service. Therefore, the key-durable storage system may in some ways operate as if it were providing only raw data storage. For example, when storing an object to the key-durable storage service, rather than providing an object to be stored along with key information (e.g., information identifying the object and/or a classification for the object, such as bucket="films" and/or object="Star Wars"), the client may merely provide raw object data to the key-durable storage service. In some embodiments, the key-durable storage service may then generate a key for the object (e.g., an opaque identifier) and send it back to the client as a return value. The client may then need to include this system-generated opaque identifier (rather than any client-specified or client-focused identifier) in any subsequent request to retrieve the object. In such embodiments, the user may store the system-generated key, indexed whatever manner they like, associate that opaque identifier with one or more client-specified identifiers and/or other application-specific parameters (e.g., "films", "Star Wars", "one time rental") in an index that is separate from the key-durable storage service. And if you want to retrieve it, you send that identifier back to the service and can pull back the data. As described herein, the key-durable storage system may in some embodiments embed data into each opaque identifier that it generates (e.g., in an encrypted format) that allows the key-durable storage service to retrieve the data.

The application of the techniques described herein may allow a key-durable storage system to store objects on behalf of storage service clients with a stretch factor very close to 1.0 (e.g., with very few bytes of system information added to the received bytes of client data) and using relatively few computational resources without sacrificing a lot of performance, when compared to other storage models. In one example, instead of transforming 90 kB of object data received from a client by erasure coding it to create nine shards of 10 kB each, or by replicating the data to create multiple objects of 90 kB each, the key-durable storage system may not transform the object data at all. Instead, the key-durable storage system may create (and redundantly store) a key for the object, which may be very small compared to the size of the object (e.g., on the order of 128 bytes).

As previously described, the key-durable storage service may assign the object to a logical volume that includes multiple disks, where the number of disks in the volume is determined by the desired durability for the system-generated keys. For example, if a key durability policy specifies that the keys should have 11 nines of durability (indicating the probability that the system will not lose the key is 99.999999999), the system may (dependent on the expected failure rate of the underlying disks being low enough) assign the object to a three-disk volume. In this example, the system may store the object (i.e., the data payload) on one of the disks, and may store the system-generated key on both of the other disks. The particular disk on which each object is stored within a volume may be selected randomly or on a rotating basis, or may be determined according to a storage balancing scheme, in different embodiments.

In one example, one object that is assigned to a particular three-disk volume may be stored on disk 2 of the assigned volume, while only the key for that object is stored on disks 1 and 3 of the assigned volume. However, if another object is subsequently received and assigned to the same three-disk volume, the system may store the other object on disk 1 or on disk 3, and may store only the key for the other object on the other two disks of the volume. Note that in some embodiments, the key is also stored on the disk that stores the object, i.e., in this example, both of the keys may be stored on all three disks of the assigned volume, but each object may be stored on only one of the disks of the assigned volume. In this example, if disk 3 of the assigned volume is lost for any reason, any objects stored on disk 3 will be lost. However, the keys for those objects will not be lost, since they are also stored on disks 1 and 2 in that volume set. In some embodiments, the key-durable storage system may be configured to determine the keys for the lost objects and report back to the client on whose behalf the lost objects were stored which objects were lost (as identified by their system-generated keys). In this example, to determine the keys for the lost objects, the key-durable storage system may be configured to interrogate all of the other disks of the assigned volume to determine what has been lost (e.g., to attempt to match up all keys stored on the other disks with objects stored on those disks). A notification may then be returned to the appropriate client or clients by the key-durable storage service that includes the unmatched keys. Once the key-durable storage system has determined what is lost, corrective action may be taken by the key-durable storage service and/or by the client. For example, another disk may be added to the volume set to replace the failed/lost disk, the client may re-send a lost object to the key-durable storage system for storage (e.g., in a new put object request), and the key-durable storage service may store the re-sent object and a corresponding system-generated key in the data store, as described herein. In different embodiments, the key-durable storage service may store the re-sent object on the replacement disk of the originally-assigned volume (or on another disk in that volume), or may assign the re-sent object to another volume for storage.

As described above, in one example of a remote data storage function that may be performed by a client application (e.g., via one of a set of APIs to the key-durable storage service), a client application may upload a data object from a client network for storage in a data store of a key-durable storage system using a put object request. In response, the key-durable storage system may return a system-generated key to the client, as described herein. One embodiment of a method for storing an object in a key-durable storage service (which may be implemented by a keymapless, volume-based data storage system in which objects are stored without redundancy) is illustrated by the flow diagram in FIG. 3. As illustrated at 300, in this example, the method may include a storage service receiving a request to store an object. In some embodiments, the request may be received through a storage service interface, such as storage service interface 140 illustrated in FIG. 1, and may adhere to an Application Programming Interface (API) specified by the storage service (e.g., a "put object" API that has been specified for and implemented by the service). As illustrated in this example, the method may include, in response to receiving the request, determining a storage volume and/or a disk to which the object is to be assigned (as in 310). For example, in some embodiments in which the data store of the storage service is volume-based, each logical storage volume may include multiple physical or logical disks, and each object may be assigned to a particular volume and to a particular disk of that volume for storage.

Figure 3:
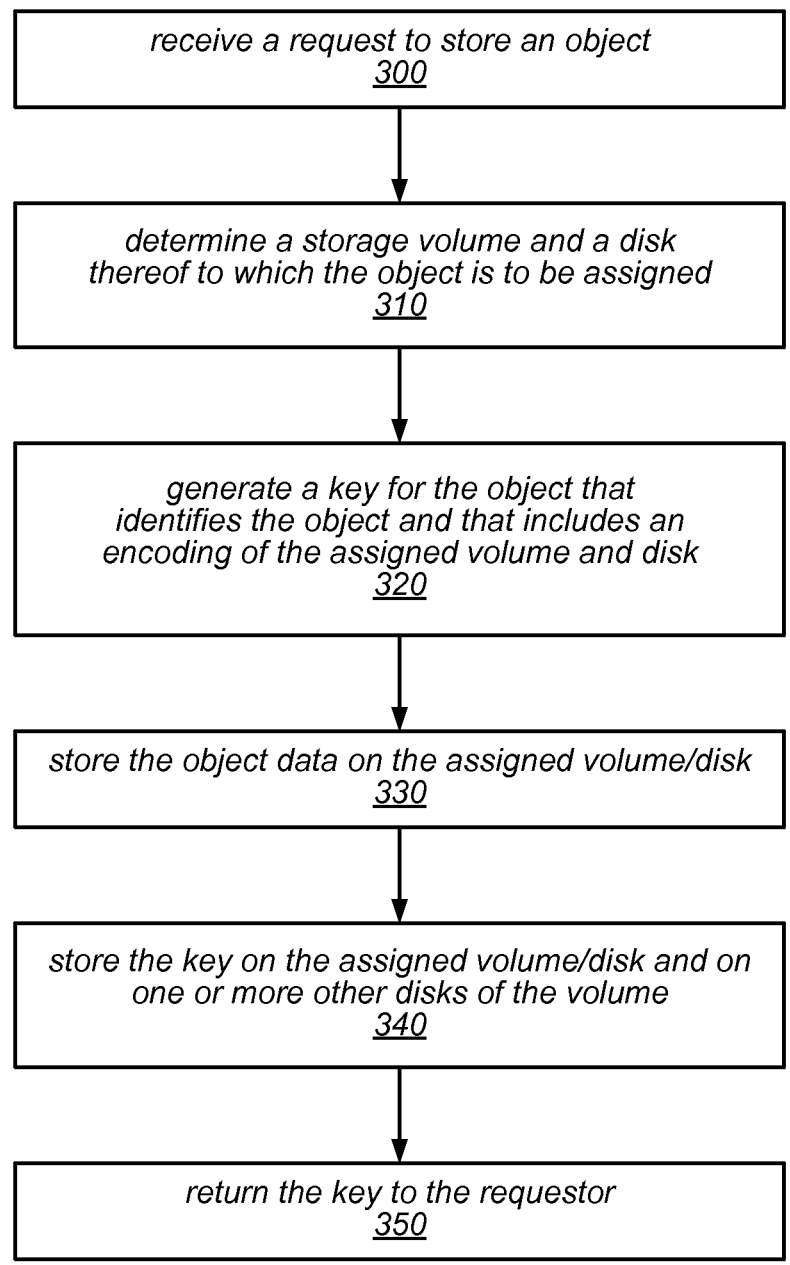
FIG. 3 is a flow diagram illustrating one embodiment of a method for storing an object to a key-durable storage service.

As illustrated in FIG. 3, the method may include the storage service generating a key for the object that identifies the object and that includes an encoding indicating the location at which the object is to be stored by the storage service (e.g., its assigned volume and/or disk), as in 320. In some embodiments, the encoding indicating the location at which the object is stored may be encrypted in the generated key. In other words, rather than the request including a key or other indexing information, the storage service may generate a key, and that key itself may include information usable by the storage service to subsequently locate the stored item. For example, the key generated by the key-durable storage service may include an encoding representing a volume identifier (volume ID) unique to the assigned volume and/or a disk identifier (disk ID) for the particular disk on which the object is to be stored on the assigned volume. In addition, the key generated by the key-durable storage service may include an encoding representing a timestamp, the size of the object, or other information usable by the key-durable storage system to perform storage functions. Collectively, the information encoded in the system-generated key may form an opaque identifier of the object. Note also that that any or all of the information encoded in the system-generated key may be encrypted by the key-durable storage service when it is generated or when it is return to the client, in various embodiments.

Figure 4:
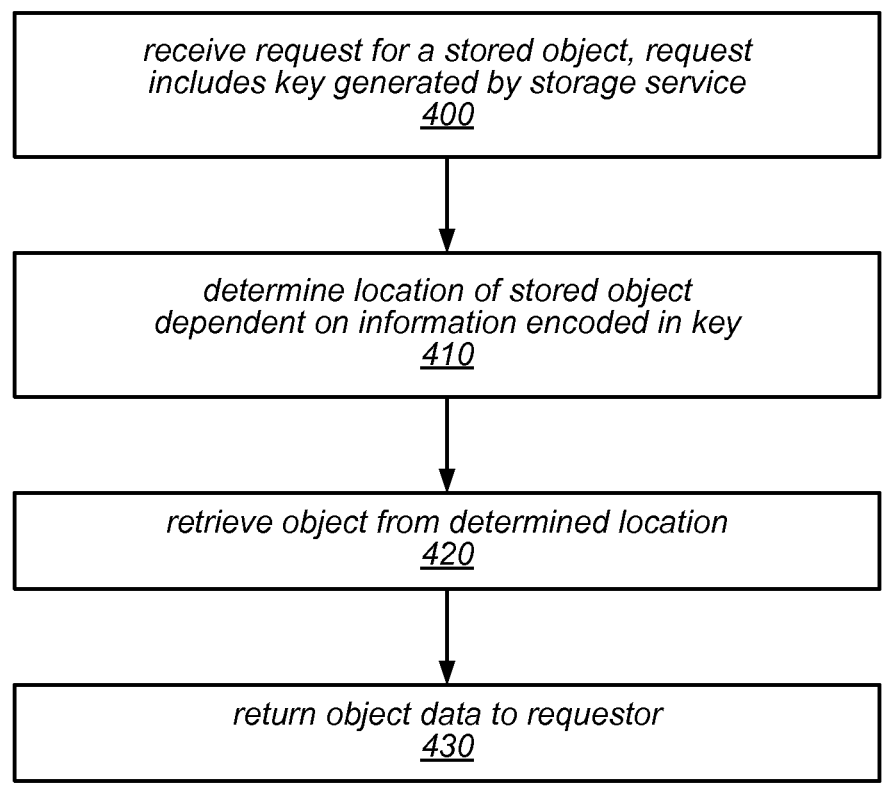
FIG. 4 is a flow diagram illustrating one embodiment of a method for retrieving an object that has been stored by a key-durable storage service.

The method may also include storing the object data on the assigned volume and/or disk (as in 330), and storing the key on the assigned volume/disk and on one or more other disks of the volume (as in 340). In other words, the method may include the storage service storing the received object data without redundancy, but storing the key for the object with some amount of redundancy. Such a scheme may provide a higher level of durability for the object key than for the object itself. As illustrated in this example, the method may include returning the key to the requestor, as in 350. This reply may indicate to the requestor that the object has been successfully stored by the storage service, and may allow the requestor to subsequently retrieve the object from the storage service (as illustrated, for example, in FIG. 4 and described below).

As previously noted, rather than receiving a "put object" request that includes a key or other indexing information and maintaining a keymap on behalf of the requestor, the storage service may generate keys for the objects it stores and may be oblivious to any mapping or indexing scheme of the requestor (e.g., a user or a client application of the storage service). In other words, it may be left to the requestor (which may be a user or a client application to the storage service) to maintain any desired mappings between keys and objects or any desired indexing of the data stored on the requestor's behalf by the storage service.

Once the storage system has returned a key for an object that has been "put" (i.e. stored), a requestor may be able to retrieve that object using a second type of request. One embodiment of a method for retrieving an object that has been stored in a key-durable storage service (which may be implemented by a keymapless, volume-based data storage system in which objects are stored without redundancy) is illustrated by the flow diagram in FIG. 4. As illustrated at 400, in this example, the method may include a storage service receiving a request for a stored object, and that request may include the key that was generated by the storage service and returned to the requestor (or to another requestor) when the object was stored by the storage service. In some embodiments, the request may be received through a storage service interface, such as storage service interface 140 illustrated in FIG. 1, and may adhere to an Application Programming Interface (API) specified by the storage service (e.g., a "get object" API that has been specified for and implemented by the service).

As illustrated in this example, the method may include, in response to receiving the request, determining the location of stored object, dependent on information that was encoded in the key when it was generated by the storage service (as in 410). For example, the key may include an encoding that indicates the logical storage volume and/or the disk of that volume on which the object is stored. As previously noted, this encoding may be encrypted in the key when the key was generated by the storage system/service. Therefore, determining the location of the stored object may include decrypting the location information in the key that was included in the request. Once the location of the stored object has been determined, the method may include the storage service retrieving the object from the determined location (as in 420), and returning the object data to the requestor (as in 430).

Figure 5:
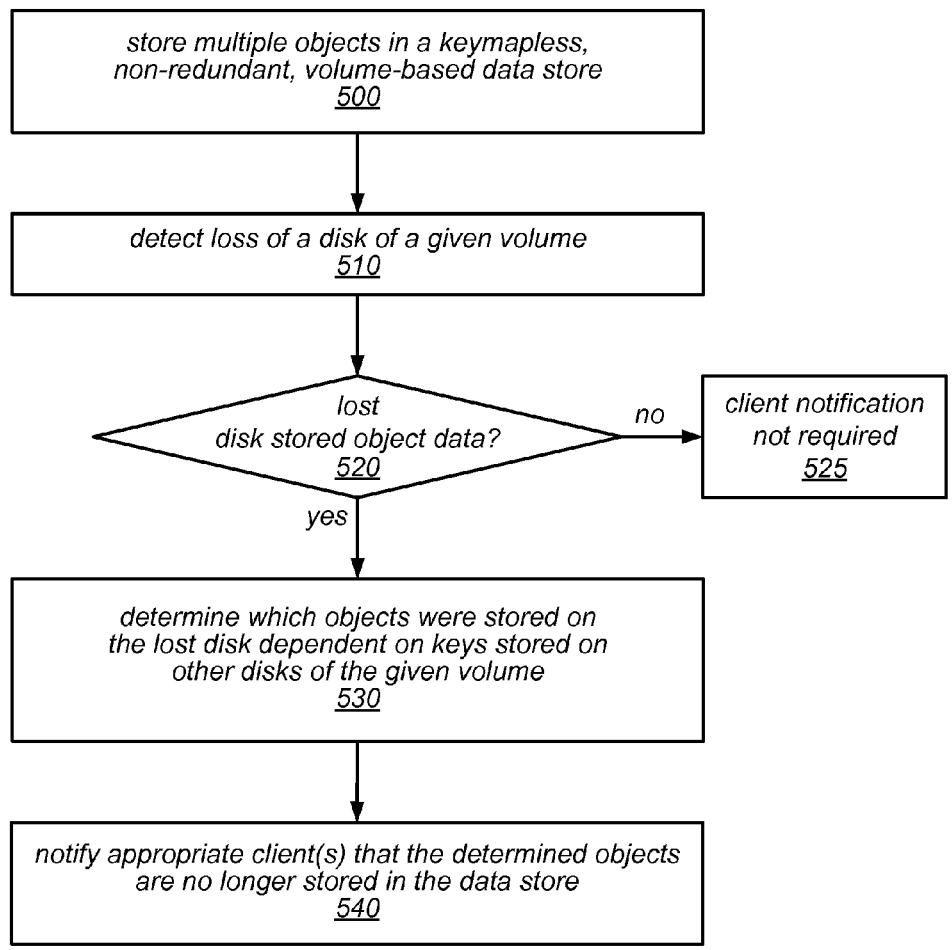
FIG. 5 is a flow diagram illustrating one embodiment of a method for detecting and reporting the loss of stored objects in a key-durable storage system.

As previously described, a key-durable storage system (a storage system underlying a key-durable storage service such as those described herein) may be configured to determine when stored objects are lost and to generate notifications that identify the lost objects. One embodiment of a method for detecting and reporting the loss of stored objects in such a system is illustrated by the flow diagram in FIG. 5. As illustrated at 500, in this example, the method may include storing multiple objects to a key-durable storage service that is implemented by a keymapless, volume-based data storage system in which objects are stored without redundancy. For example, the objects may be stored in the data store by a storage service in response to receiving a request to do so (e.g., through a storage service API, as described herein). As illustrated in this example, the storage system may detect the loss of a disk of a given volume (as in 510). For example, the storage system may detect that a disk has been damaged, compromised or corrupted, that it has gone off-line, or that it has otherwise failed in a manner in which there is at least the potential that data stored on the disk has been lost.

Figure 6:
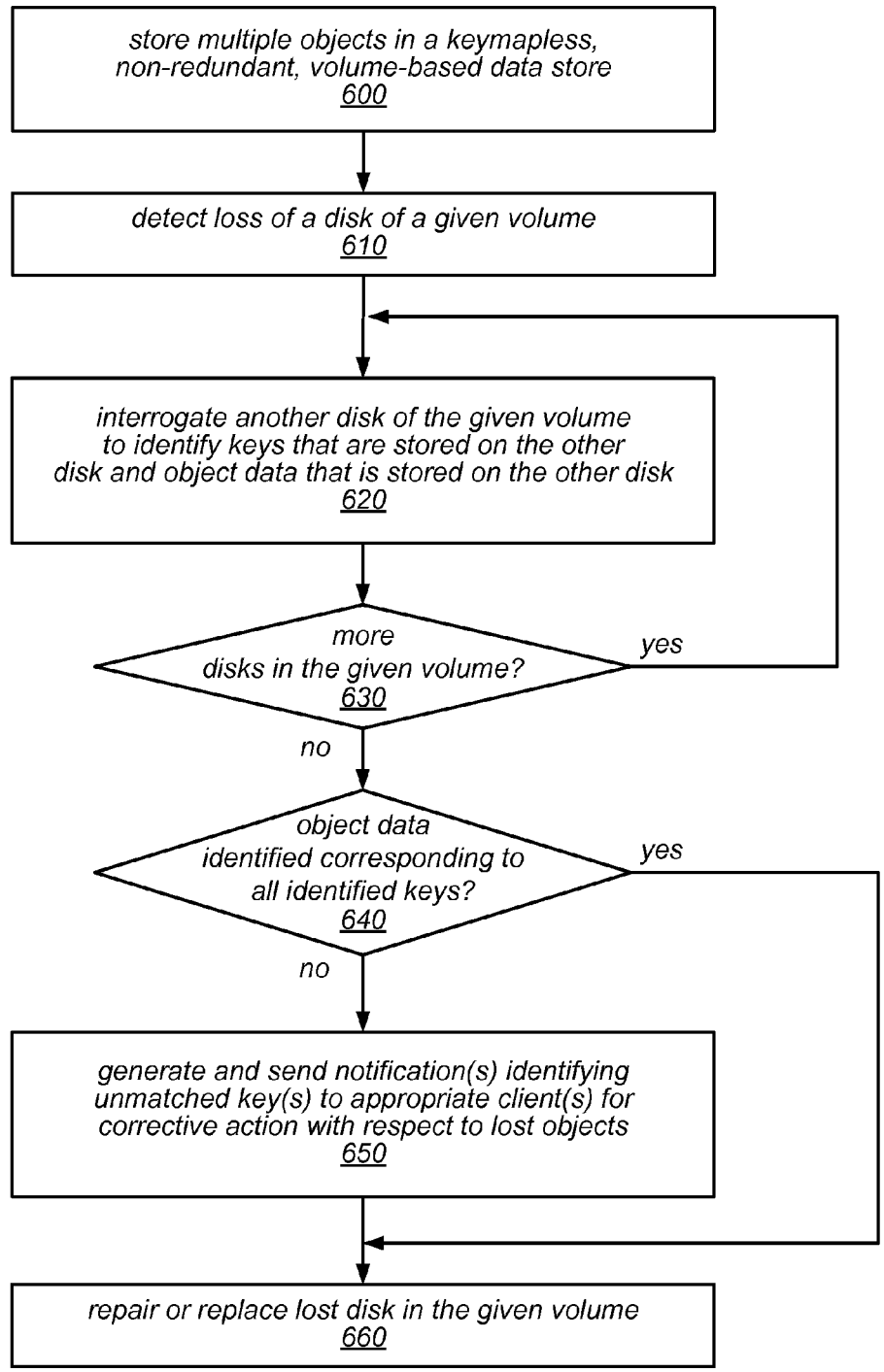
FIG. 6 is a block diagram illustrating one embodiment of a method for determining which, if any, objects were lost when a disk in a key-durable storage system is lost.

In situations in which a disk has been lost, the storage system may be able to determine whether the lost disk stored any object data (e.g., on behalf of storage service clients), as in 520. If not (shown as the negative exit from 520), there may be no need to notify any storage service clients of the loss of the disk (as shown in 525). For example, in some embodiments only a subset of the disks in a given volume store object data, and there may not have been any object data stored on the lost disk. However, if the storage system determines that the lost disk stored object data (shown as the positive exit from 520), the method may include determining which objects were stored on the lost disk, and this determination may be dependent on examining the keys (and perhaps objects) that are stored on other disks of the given volume (as in 530. One embodiment of a method for making such a determination is illustrated in FIG. 6 and described below. As illustrated in this example, once the objects that were stored on the lost disk have been identified, the method may include the storage system notifying the appropriate storage service client(s) that the determined objects are no longer stored in the data store, as in 540. The storage service client(s) may (or may not) take corrective action, as appropriate for their particular circumstances and storage system use models.

One embodiment of a method for determining which, if any, objects were lost when a disk in a keymapless, volume-based, non-redundant data storage system (e.g., a system underlying a key-durable storage service such as those described herein) is lost in illustrated by the flow diagram in FIG. 6. As in the example illustrated in FIG. 5, the method may include storing multiple objects in a keymapless, non-redundant, volume-based data store (as in 600). For example, the objects may be stored in the data store by a storage service in response to receiving a request to do so (e.g., through a storage service API, as described herein). As illustrated in this example, the storage system may detect the loss of a disk of a given volume (as in 610). For example, the storage system may detect that a disk has been damaged, compromised or corrupted, that it has gone off-line, or that it has otherwise failed in a manner in which there is at least the potential that data stored on the disk has been lost.

As illustrated in this example, the method may include the storage service interrogating another disk of the given volume to identify any keys that are stored on the other disk and any object data that is stored on the other disk (as in 620). For example, each disk in a volume of the data store may store object data on behalf of storage service clients, keys corresponding to objects stored on this or another disk (e.g., keys generated by the storage service when the objects were stored by the service), or both object data and keys. Note that in some embodiments, one subset of the disks in the given volume may be configured to store object data, while a different subset of the disks in the given volume (which may or may not overlap the first subset) may be configured to store keys. In various embodiments, each key generated by the storage system may be stored on the same disk as the corresponding object data for which it was generated and/or may be stored on one or more disks other than the one on which the corresponding object data is stored. Different examples of the storage of keys and corresponding object data on the disks of a given volume are illustrated in FIGS. 7A and 7B and described below. In the example illustrated in FIG. 6, it is assumed that object data for each object stored by the storage service is stored on only one of the disks of the given volume, and that the corresponding keys are stored on two or more disks of the given volume (one of which may be the same disk as the one on which the object data is stored).

In this example, if there are more disks in the given volume, the method may include the storage service interrogating each of the other disks in the given volume in turn to identify any keys that are stored on those disks and any object data that is stored on those disks. This is illustrated in FIG. 6 by the feedback from the positive exit of 630 to element 620. Once all of the disks of the volume other than the lost disk have been interrogated (or at least all of the disks of the volume that store object data and/or keys on behalf of the storage system), the method may include the storage service determining whether corresponding object data was identified on any of the disks of the volume for all of the identified keys (as in 640). In other words, the method may include attempting to match all of the keys that are stored on any of the remaining disks of the volume (i.e., all disks other than the lost disk) to object data that is stored on the remaining disks. For example, each of the keys stored on the remaining disks of the volume may be encoded with an identifier of the corresponding object, and a cumulative list of keys identified by interrogating the remaining disks of the volume may be compared with a cumulative list of objects identified by interrogating the remaining disks of the volume to identify matches.

If the results of the interrogation and comparison described above indicate that there are any keys stored on disks of the volume for which the corresponding object data was not found on any remaining disks of the volume (shown as the negative exit from 640), the method may include the storage service generating and sending one or more notifications identifying the unmatched key(s) to the appropriate storage service client(s) for corrective action with respect to the corresponding lost objects (as in 650). In other words, a client that relies on a key-durable storage service (e.g., one implemented by a keymapless, volume-based, non-redundant data storage system such as those described herein) to store objects on its behalf may be responsible for maintaining any desired mappings between keys and object data (e.g., using any desired indexing scheme) and for replacing any lost objects that are identified by the storage system (if appropriate). As illustrated in this example, if corresponding object data is located on the remaining disks for each of the keys stored in the remaining disks (shown as the positive exit from 640), there may be no client notification necessary. In either case, following the identification of any lost objects (or the keys thereof), the method may include repairing and/or replacing the lost disk in the given volume, as in 660. In other words, while the key-durable storage service (and underlying storage system) may not be responsible for restoring or reconstructing any lost objects, the storage service may be responsible for maintaining the number of disks per volume that is sufficient to achieve a desired durability for objects and keys according to whatever durability schemes are implemented in the storage system.

Various durability schemes for objects and/or keys that may be supported by a key-durable data storage service (and underlying storage system) and/or in other storage systems (including a highly-redundant, object durable storage system) are described herein, according to different embodiments.

Note that in some embodiments, a disk on which a failure has been detected may not have completely failed and the detected failure may not result in the loss of all of the data on that disk. In fact, in some cases, the disk may still be accessible even if some of the data on the disk has been corrupted. In such embodiments, the determination of unmatched keys may include interrogating the failed disk to determine which, if any, of the objects stored on that disk remain stored on the disk and which, if any, of the objects stored on the disk have been lost.

Note that in some embodiments, the determination of unmatched keys following a loss of data may be made less computationally expensive by noting the disk on which each object is stored when storing the key on the other disks of the assigned volume (e.g., by encoding this information in the key itself or by including this information in a write message sent to the other disks to store the key on those disks). In some embodiments, if the disk on which an object is stored is communicated to the other disks when the key is written to those disks, the key may be stored on the other disks according to this information. For example, the key-durable storage service may store keys corresponding to objects stored on disk 2 of a three-disk volume in one area on disk 1, and may store keys corresponding to objects stored on disk 3 of the volume in another area on disk 1. In some embodiments, if the disk on which an object is stored was communicated to the other disks when the key was written to those disks, the determination of unmatched keys following a loss of data may be simplified by searching for objects matching the keys found on the remaining disks only on the disks on which the objects were stored (rather than on all of the disks in the volume set), or only on the failed disk. In some embodiments, the determination of unmatched keys may include gathering the keys stored on all of the disks in a volume set in case not all of the keys corresponding to objects stored on the failed disk have been propagated to all of other disks in the volume set yet (e.g., if a write failed, if a disk was under repair at the time, or for some other reason).

The key-durable storage services (and underlying systems) described herein may store objects and corresponding keys in volumes and on disks thereof according to a variety of storage policies and in a variety of arrangements. As previously noted, each disk in a volume of the data store may store object data on behalf of storage service clients, keys corresponding to objects stored on this or another disk (e.g., keys generated by the storage service when the objects were stored by the service), or both object data and keys. In one embodiment in which the data store of the storage service is volume-based, each logical volume may include multiple physical or logical disks, and each object may be assigned to a particular volume. As previously noted, in various embodiments a key generated by the key-durable storage system for a particular object may be stored on two or more disks of the volume to which the object is assigned, and the disks on which the key is stored may include the disk on which the particular object is stored. FIG. 7A illustrates an example of such an embodiment. In other embodiments, the disks on which the key is stored may not include the disk on which the particular object is stored. In some embodiments, the volume assignment may be static, while the disk assignments for the objects and/or keys may not be (i.e., the key-durable storage service may be able to move objects and/or keys between the disks of an assigned volume in response to a disk failure, or to balance storage resources or request traffic between the disks).

In the example illustrated in FIG. 7A, a volume 700 includes at least three disks (shown as disks 730a-730c). Volume 700 may be similar to one of the volumes 130a-130n illustrated in data store 120 in FIG. 1. In this example, one instance of each of six objects (shown as objects 735a-735o is stored on behalf of one or more storage service clients on volume 700, and multiple instances of each of the corresponding keys generated by the key-durable storage system (shown as keys 737a-737f) are also stored on volume 700. In this example, the key corresponding to each object is stored on the same disk as that object and is also stored on both of the other two illustrated disks. For example, object 735a is stored only on disk 730a, and corresponding key 737a is also stored on disk 730a. However, key 737a is also stored on disk 730b and on disk 730c. Similarly, object 735b is stored only on disk 730a, while its key (737b) is stored on all three disks (730a-730c). In this example, object 735c is stored only on disk 730b (and is the only object stored on disk 730b), but its key (737c) is stored on all three disks (730a-730c). Finally, objects 735d, 735e and 735f are stored only on disk 730c, while their respective keys (737d, 737e and 737f) are stored on all three disks (730a-730c). In other words, in this example, the desired durability for the keys may be satisfied by storing three copies of each key on different disks of the assigned volume. Note that in some embodiments, some of the disks in a volume set in a key-durable storage system may store other types of data in addition to or instead of objects and/or keys that are stored on behalf of storage system clients (not shown). Note also that keys may be stored with redundancy in the key-durable storage system according to a redundancy scheme other than replication (e.g., using erasure coding or another error correction coding), in other embodiments.

As illustrated in this example, if one of the disks of volume 700 fails, one, two or three objects stored on behalf of clients may be lost. However, since the keys for the lost objects are stored on the other two disks of volume 700, the key-durable storage service may be able to determine which objects are lost, and may notify the appropriate client(s) of the loss of data, e.g., by sending a notify message that includes the corresponding key(s). In response to the notification, the client may re-send the lost objects to the key-durable storage service, which may store them on a remaining one of disks 730a-730c, on another existing disk of volume 700 (not shown), or on a disk that has been added to volume 700 to replace the lost disk (not shown), in different embodiments. In some embodiments, the key-durable storage service may also store additional copies of the keys for the lost objects on another existing disk of volume 700 (not shown), or on a disk that has been added to volume 700 to replace the lost disk (not shown), in order to maintain three copies of each key that corresponds to an object stored on volume 700.

As previously noted, in some embodiments, a subset of the disks in a given volume may store object data, while a different subset of the disks in the given volume may store keys. FIG. 7B illustrates an example of such an embodiment. In some embodiments, the volume assignments may be static, while the disk assignments for the objects and/or keys may not be (i.e., the key-durable storage service may be able to move objects and/or keys between the disks of an assigned volume in response to a disk failure, or to balance storage resources or request traffic between the disks).

In the example illustrated in FIG. 7B, a volume 710 includes at least three disks (shown as disks 720a-720c). Volume 710 may be similar to one of the volumes 130a-130n illustrated in data store 120 in FIG. 1. In this example, one instance of each of six objects (shown as objects 735a-735f) is stored on behalf of one or more storage service clients on volume 710, and multiple instances of each of the corresponding keys generated by the key-durable storage system (shown as keys 737a-737f) are also stored on volume 710. In this example, disk 720a is the only one of the illustrated disks of volume 710 that stores object data. Therefore, a single instance of each of the objects 735a-735f is shown stored on disk 720a. In this example, the keys corresponding to those objects (keys 737a-737f) are not stored on the same disk as the object data, but are stored on both of the other two illustrated disks (720b and 720c). In other words, in this example, the desired durability for the keys may be satisfied by storing two copies of each key on different disks of the assigned volume, and those disks may be different than the disk on which the object data is stored. Again note that in some embodiments, some of the disks in a volume set in a key-durable storage system may store other types of data in addition to or instead of objects and/or keys that are stored on behalf of storage system clients (not shown), and that keys may be stored with redundancy in the key-durable storage system according to a redundancy scheme other than replication (e.g., using erasure coding or another error correction coding).

As illustrated in this example, if disk 720a of volume 710 fails, all six objects stored on behalf of clients on volume 710 may be lost. However, since the keys for these lost objects are stored on the other two disks of volume 710, the key-durable storage service may be able to determine which objects are lost, and may notify the appropriate client(s) of the loss of data, e.g., by sending a notify message that includes the corresponding key(s). In response to the notification, the client may re-send the lost objects to the key-durable storage service, which may store them on a remaining one of disks 720b-720c, on another existing disk of volume 710 that is configured to store object data (not shown), or on a disk that has been added to volume 710 to replace the lost disk (not shown), in different embodiments. On the other hand, if one of disks 720b or 720c fails, no object data will be lost, and there may be no need to send a notify message to any of the storage service clients. However, in this case, the key-durable storage service may be configured to duplicate the keys stored on the remaining one of disks 720b and 720c, and to store the additional copies of the keys on another existing disk of volume 710 (not shown), or on a disk that has been added to volume 710 to replace the lost disk (not shown), in order to maintain two copies of each key that corresponds to an object stored on volume 710.

As previously noted, the "client" of a key-durable storage service may in some embodiments be another storage service (e.g., a highly-durable, object-redundant storage service that employs replication or erasure coding). In one example, an object-redundant storage service may employ an 18/9 erasure coding scheme. In this example, for every byte that gets uploaded to the object-redundant storage service on behalf of a client, the object-redundant storage service performs a mathematical transform of that data and produces two bytes worth of system data from the one byte of client data, and then breaks that object up into shards. In this example, if a client stores a 90 kB object, the object-redundant storage service may transform that object into 180 kB of system data, and then break it into 18 shards, each containing 10 kB of system data. The mathematical transform has the property that to reconstruct the object, only 9 of those shards (e.g., any random 9 of the shards) are needed. Therefore, to retrieve the object from the object-redundant storage service, 9 of the shards must be retrieved. The object-redundant storage service may store those 18 shards in a distributed data store that is implemented across multiple data centers (e.g., 6 in each of 3 data centers in the system). When a request to retrieve the object is received, the object-redundant storage service may, for example, pull 6 shards from a local data center and 3 from one of the remote data centers, reconstruct the original object (using an inverse of the transform used to create the shards) and return the reconstructed object to the requestor.

The object-redundant storage scheme described above provides good durability in that even if up to 9 shards are lost, the object-redundant storage service will be able to reconstruct the object. In some cases, the object-redundant storage service may employ background processes that are constantly examining the data stores to determine whether any shards are lost, to reconstruct or repair objects, etc. In this example, the number of lost shards drops close to 9 of the 18, these background processes may try to drive the number back up to 18 of 18 (e.g., by reconstructing the original object and re-sharding). This object-redundant storage scheme may be well-suited for dealing with system-level durability issues (e.g., when a rack of disks burns up, one or more hard drives fail, or an entire data center does offline due to a power failure), but may not protect the stored objects well from other types of data loss problems, such as accidents or malice (internal or external).

In various embodiments, an object-redundant storage system may be better protected from such losses by backing up some of all of the data stored in the object-redundant storage system to another storage system, such as a key-durable storage system. For example, in one embodiment in which some of the objects stored in the object-redundant storage system may be very short-lived, every object in the object-redundant storage system that is older than a predetermined age (e.g., 6 hours) may pushed to a key-durable storage system, and the same erasure coding may be applied by the key-durable storage system that is applied by the object-redundant storage system. In this example, the data set stored in the two systems may be periodically reconciled (e.g., eventually deleting an object from the key-durable storage system that was previously deleted from the object-redundant storage system, or updating an object in the key-durable storage system that was previously updated in the object-redundant storage system). However, because the overall system storage would be doubled using this scheme, it may be expensive to implement.

In another embodiment, the objects stored in the object-redundant storage system may be pushed to a key-durable storage system, but the objects may not be erasure coded by the key-durable storage system when they are stored by the key-durable storage system. For example, if an object that includes 90 kB is received by the object-redundant storage system, the object-redundant storage system may transform the object into 180 kB of data for storage, but the key-durable storage system may store the 90 kB object without performing such a transformation (or generating a large amount of system data). In this example, the key-durable storage system may apply the techniques described above for storing the object, generating a key for the object, returning the key to the object-redundant storage system, and/or notifying the object-redundant storage system of the loss of the object, if necessary.

In yet another embodiment, the object-redundant storage system may apply erasure coding to an object that it stores, and then may push some or all of the shards created by the erasure encoding to a key-durable storage system as a backup mechanism for the object-redundant storage system. In this example, each shard may be treated by the key-durable storage system as if it were an individual, independent object. In other words, for each shard pushed to the key-durable storage system from the object-redundant storage system, the key-durable storage system may apply the techniques described above for storing the shard, generating a key for the shard, returning the key to the object-redundant storage system, and/or notifying the object-redundant storage system of the shard of the object, if necessary. The object-redundant storage system may then take appropriate action to replace the share in the key-durable storage system, as described in more detail below.

As noted above, the key-durable storage system may approach a stretch factor of 1.0 when the system-generated keys are small compared to the corresponding stored objects. In such embodiments, statistically, the overhead for storing those keys redundantly across a number of disks is very low. For example, if the disks in a key-durable storage system have an expected annual failure rate of 2%, a single disk loss in a three-disk volume will result in a loss of data (e.g., the individual objects or object shards stored on that disk), but the keys for that data have a higher durability and can withstand three disk losses (with an expected annual failure rate of 2%×2%×2%, or 0.0008%). This level of durability may be well suited for a combination storage system in which a key-durable storage system is used to back up a more expensive object-redundant storage system.

Figure 8:
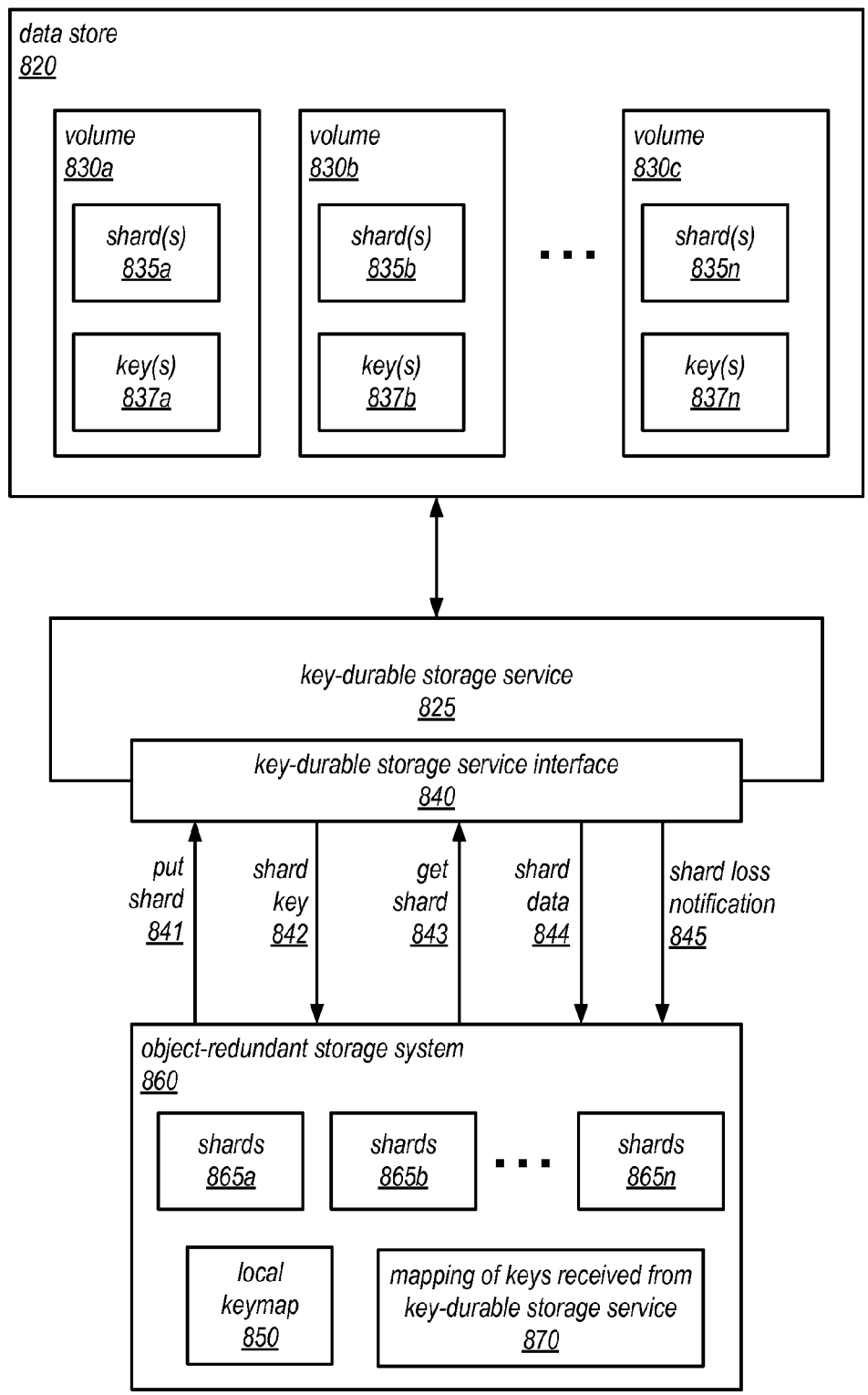
FIG. 8 is a block diagram illustrating a system in which a key-durable storage service is used to back up data stored by an object-redundant storage system, according to one embodiment.

FIG. 8 is a block diagram illustrating the use of a key-durable storage service and its underlying storage system (e.g., a keymapless, volume-based, non-redundant data storage system) to back up data stored by another storage system (e.g., a highly-durable, object-redundant storage system), according to one embodiment. The system illustrated in FIG. 8 includes several elements similar to those illustrated in the block diagram in FIG. 1. For example, the system includes a key-durable storage service 825 and APIs 841-845 of a key-durable storage service interface 840 to the service for performing storage functions on a data store 820 that is based on virtual or logical volumes. The key-durable storage service stores data (shown as 835a-835n) and corresponding keys (shown as 837a-837n) on behalf of a storage service client in multiple volumes (e.g., volumes 830a-830n) of data store 820, and each of those volumes may include multiple disks that store client data, keys, or both, as described herein. However, in this example, rather than a client application (such as client applications 160 in FIG. 1) leveraging APIs 841-845 to store individual (e.g., unrelated objects) in data store 820 of key-durable storage service 825, the "client" is an object-redundant storage system 860 that stores at least a portion of its redundant object data to data store 820 of key-durable storage service 825.

As described herein, an object-redundant storage system may receive an object to be stored in the system and may apply any of a variety of redundancy mechanism to store the received object in its own data stores with a high level of durability. In this example, object-redundant storage system 860 creates a collection of shards 865 for each of the objects that it receives (shown as shards 865a-865n) using an erasure coding technique such as those described herein. For example, shards 865a in FIG. 8 may represent the shards created by applying erasure coding to a received object, and shards 865b may represent the shards created by applying erasure coding to a different received object. As illustrated in this example, object-redundant storage system 860 may include a local keymap 850, which may store data indicating where each of the shards corresponding to a particular object are stored in the data stores of object-redundant storage system 860.

The key-durable storage service 825 and APIs 841-845 may be similar to APIs 141-145 of FIG. 1 and may provide a standard interface to the data store 820 through key-durable storage service interface 840. For example, these and other APIs to the key-durable storage service 825 may be implemented according to different technologies, including, but not limited to, Simple Object Access Protocol (SOAP) technology and Representational state transfer (REST) technology. In some embodiments, these APIs may be wrapped with client libraries in various languages, including, but not limited to, C, C++, Java, C# and Perl to support integration of object-redundant storage system 860 with the key-durable storage service 825. However, in this example, the generic "put object" API (shown as 141 in FIG. 1) and corresponding "return object key" API (shown as 142 in FIG. 1) are applied to store shards produced by object-redundant storage system 860 and are shown in FIG. 8 as 841 and 842, respectively. Note that, in this example, while multiple shards of a single object may be stored to key-durable storage service 825 using an API 841 to "put" (i.e., store) a shard to the key-durable storage service 825, the key-durable storage service 825 may treat each shard as if it were an individual object to be stored in data store 820, and may be oblivious to any relationships between the shards received from object-redundant storage system 860 through key-durable storage service interface 840. Therefore, key-durable storage service 825 may arbitrarily assign multiple shards created for a single object by object-redundant storage system 860 for storage on the same or different ones of volumes 830a-830n in data store 820.

In the example illustrated in FIG. 8, various received shards 835 are stored on each volume 830, along with various keys 837 that are generated by key-durable storage service 825 when each shared was received and stored in data store 820. As described herein, each of these keys may include encrypted information that enables the key-durable storage service to retrieve the data corresponding to that key. For example, each of the keys may encode information indicating where the corresponding shard is stored (e.g., its assigned volume and/or disk) and an identifier of the shard (which may be unique within the data managed by key-durable storage service 825, within data store 820 or a particular data storage center, or within the shard's assigned volume, in some embodiments). The shards 835 and corresponding keys 837 may be stored on the disks of their assigned volumes according to any of a variety of storage policies, including but not limited to those illustrated in FIGS. 7A-7B and described herein. In some embodiments, the key-durable storage service 825 may provide higher durability for the keys 837 than for the shards 835, and the number of disks in each volume may determine the durability of the keys stored in that volume. In one such embodiment, a single instance of each received shard may be stored on only one disk of its assigned volume, while multiple instances of a corresponding key that is generated by key-durable storage service 825 for the shard may be stored on two or more disks of that assigned volume (which may or may not include the disk on which the shard is stored).

In the example illustrated in FIG. 8, the generic "get object" API (shown as 143 in FIG. 1) and corresponding "return object data" API (shown as 144 in FIG. 1) are applied to retrieving those shards that are stored in key-durable storage service 825 and are shown in FIG. 8 as 843 and 844, respectively. Note that, as described above, not all of the shards created by object-redundant storage system 860 are necessarily stored to key-durable storage service 825. Rather, only a subset of those shards may be stored to key-durable storage service 825, in some embodiments. For example, in some embodiments, the subset of shards may include enough shards to reconstruct the object. In other embodiments (e.g., embodiments in which object-redundant storage system 860 stores at least as many shards as are needed to reconstruct the object in its own data stores), the subset of shards stored to key-durable storage service 825 may include any excess shards (i.e., shards that that are beyond the number of shards stored by object-redundant storage system 860). In still other embodiments, all of the shards created by object-redundant storage system 860 may be stored to key-durable storage service 825. In this example, the generic "notify object loss" API (shown as 145 in FIG. 1) is applied to provide a notification in the case of the loss of data corresponding to a stored shard (shown as 845). In some embodiments, the APIs provided by key-durable storage service 825 may include more, fewer, or different APIs for invoking or receiving responses to storage-related operations or other operations. For example, the APIs provided by key-durable storage service 825 may include a "delete object" API and/or APIs to support performance monitoring, metrics collection, state gathering, or various other system-level functions.

As illustrated in this example, object-redundant storage system 860 may include a mapping of the keys generated by and received from the key-durable storage service (shown as 870). In some embodiments, the information stored in this mapping may map the received keys to the collections of shards 865a-865n and/or to the data stored in keymap 850.

Note that in some embodiments, a key-durable storage system may be used to back up data stored in a highly-durable, object-redundant storage system that relies on replicated data rather than erasure coding to provide redundancy. In such embodiments, the object-redundant storage system may use the APIs described herein to put one or more replicas of each of various objects that are stored on behalf of clients by the object-redundant storage system to the key-durable storage service, and each of the replicas may be treated by the key-durable storage service as if they were individual (i.e., unrelated) objects to be stored. The key-durable storage service may store the received replicas (along with multiple copies of corresponding keys generated by the key-durable storage service) on various volumes of a data store of the key-durable storage service. In this example, the object-redundant storage system may retrieve one of the replicas by sending a get request that includes the corresponding system-generated key. In this example, if a replica is lost by the object-redundant storage system, the object-redundant storage system may or may not request a copy from the key-durable storage system (e.g., depending on how many other replicas remain in the object-redundant storage system). Similarly, if a replica is lost by the key-durable storage system, and the object-redundant storage system is notified to that effect, the object-redundant storage system may or may not put another copy of the object to the key-durable storage system (e.g., depending on how many other replicas remain in the object-redundant storage system and/or in the key-durable storage system).

Figure 9:
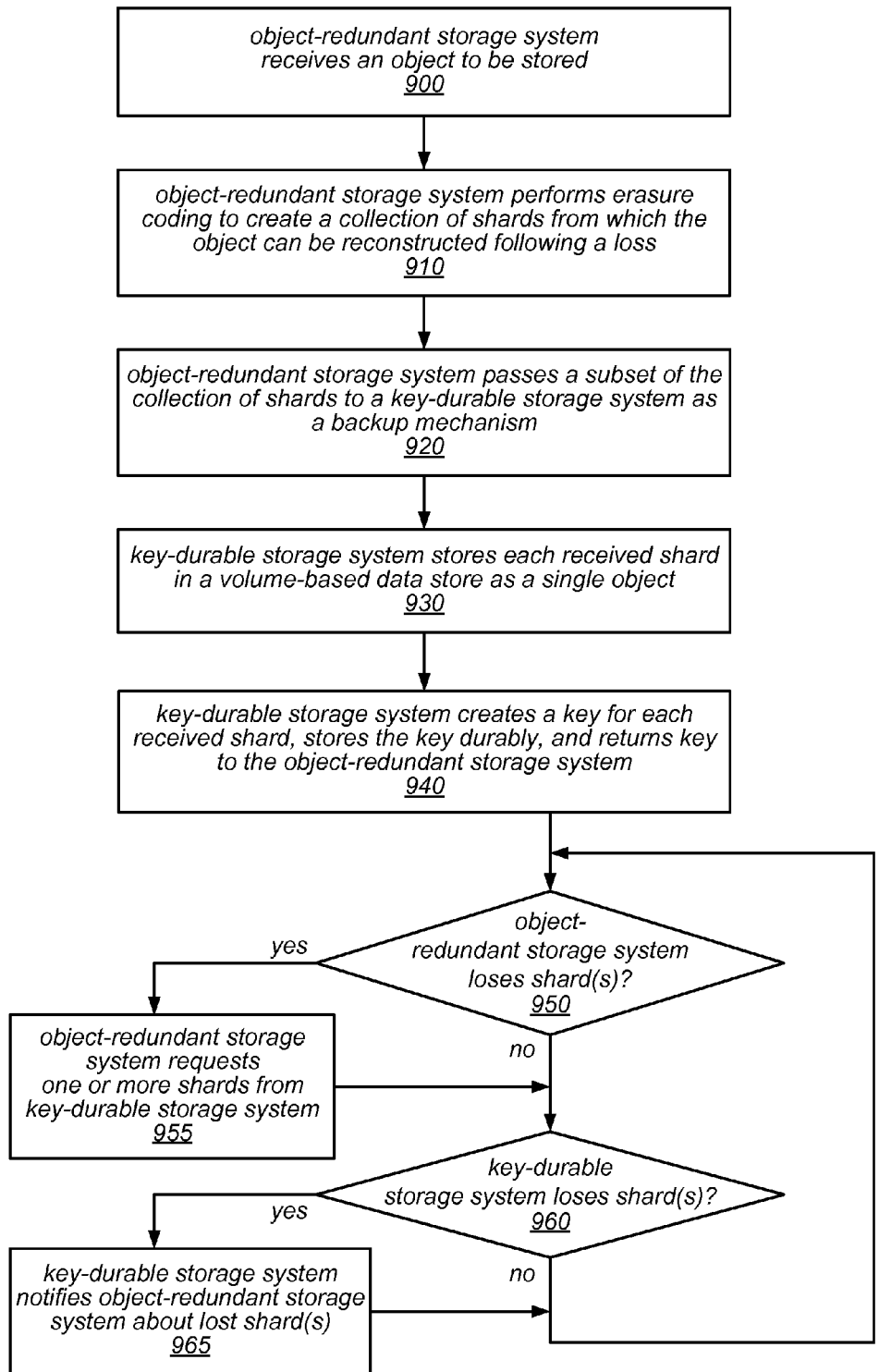
FIG. 9 is a flow diagram illustrating one embodiment of a method for using a key-durable storage system to back up data stored by a highly-durable, object-redundant storage system.

One embodiment of a method for using a key-durable storage system (e.g., a keymapless, non-redundant data storage system) to back up data stored by another storage system (e.g., a highly-durable, volume-based, object-redundant storage system) is illustrated by the flow diagram in FIG. 9. As illustrated at 900, in this example, the method may include an object-redundant storage system receiving an object to be stored. The object-redundant storage system may perform erasure coding to create a collection of shards from which the object can be reconstructed following a loss (as in 910). In one example, the object-redundant storage system may implement an 18/9 erasure coding scheme, and may generate 18 shards for the object, any 9 of which may be used to reconstruct the object. The object-redundant storage system may store at least some of the 18 shards locally, according to its local durability requirements and implemented durability scheme. In this example, the object-redundant storage system may store only 9 shards locally, or may store more than the minimum number of shards to reconstruct the object locally, in different embodiments.

As illustrated in this example, the method may include the object-redundant storage system passing a subset of the collection of shards to a key-durable storage system as a backup mechanism (as in 920). In some embodiments, the number of shards passed to the key-durable storage system for storage may be equal to the number of shards required to reconstruct the object in the case of a loss of data (e.g., if one or more shards are lost). In other embodiments, the number of shards passed to the key-durable storage system for storage may be fewer than the number of shards required to reconstruct the object in the case of a loss of data. In the example described above, the object-redundant storage system may store 12 shards itself (which is more than the number of shards needed to reconstruct the object) and may pass the other 6 shards to the key-durable storage system for storage.

As illustrated at 930, in this example, the method may include the key-durable storage system storing each received shard in a volume-based data store as a single, individual object (e.g., as if the shards represent unrelated data objects). In this example, the key-durable storage system may create a key for each received shard (using any suitable technique for creating a key that identifies the shard and encodes information usable for locating it when stored in the key-durable storage system, including those described herein), may store the key durably (e.g., in two or more disks of a volume that also stores the data for the shard), and may return the key to the object-redundant storage system (as in 940). As in previous examples, the object-redundant storage system may be responsible for creating and maintaining any mappings between the shards that are stored by the key-durable storage system and the keys created for those shards by the key-durable storage system and/or any indexing structures used by the object-redundant storage system according to its durability, availability and/or accessibility requirements (which may include one or more keymaps).

As illustrated in this example, if at any point after the subset of shards has been stored in the key-durable storage system, the object-redundant storage system loses one or more shards for the object (shown as the positive exit from 950), the method may include the object-redundant storage system requesting one or more shards from the key-durable storage system (as in 955). For example, if the number of shards stored by the object-redundant storage system drops close to the minimum number of shards required to reconstruct the object, the object-redundant storage system may send a request to the key-durable storage system that includes the key corresponding to a lost shard (e.g., using a "get object" API of the key-durable storage system), and the key-durable storage system may return the requested data to the object-redundant storage system in response. In another example, the object-redundant storage system may send multiple requests to the key-durable storage system, each of which includes a key corresponding to one of the shards stored in the key-durable storage system, (e.g., enough shards to reconstruct the object with or without any shards that were stored by the object-redundant storage system and have not been lost), and the key-durable storage system may return the requested data to the object-redundant storage system in multiple responses.

Note that in some embodiments, once the object-redundant storage system receives the requested shard data from the key-durable storage system, it may reconstruct the object using at least the shards received from the key-durable storage system and may re-shard the reconstructed object. In some embodiments, the object-redundant storage system may then send a subset of the new collection of shards (for the reconstructed object) to the key-durable storage system for storage. In other embodiments, unless the object has been updated since the subset of the original collection of shards was passed to the key-durable storage system for storage (or the new collection of shards is different from the original collection of shards for some other reason), there may be no need to send a subset of the new collection of shards to the key-durable storage system for storage.

As illustrated in this example, if at any point after the subset of shards has been stored in the key-durable storage system, the key-durable storage system determines that it has lost one or more shards (shown as the positive exit from 960), the method may include the key-durable storage system notifying the object-redundant storage system about the lost shard(s), as in 965. As described herein, such a notification may include the key(s) that were created by the key-durable storage system for each of the lost shards. As previously noted, the object-redundant storage system may be responsible for maintaining a mapping indicating where (and on which storage system) each of the members of the set is stored. This mapping may include, for each shard, a local object key (one used to identify the shard in the object-redundant storage system and/or in the client application), and a key generated by the key-durable storage system (if the shard is stored by the key-durable storage system). Therefore, if the object-redundant storage system receives a notification that one of the shards stored by the key-redundant storage system is lost, the object-redundant storage system may be able to identify the lost shard by its system-generated key and perform a repair, as needed. In various embodiments, in response to receiving such a notification, the object-redundant storage system may re-submit the lost shard to the key-durable storage system (if another copy exists), may reconstruct the object from any remaining shards for the object (i.e., if it stores enough of the shards locally to be able to reconstruct the object) and perform a new erasure coding to create a complete set of shards (some or all of which may be stored to the key-durable storage system), or may take another action.

Note that, as illustrated in this example, employing a key-durable storage system (e.g., one implemented by a keymapless, volume-based, data storage system in which objects are stored without redundancy) in combination with an highly-redundant object-redundant storage system (e.g., as a backup mechanism for the highly-redundant, object-durable storage system) may provide a cost-effective, yet highly-durable storage solution for clients of a data storage service. For example, as illustrated by the feedback from 955 to 960, from 965 to 950, and from 960 to 950, such a system may be configured to detect and recover from the loss of object data in either system without the need to duplicate all of the data stored in the object-redundant storage system and all of the durability mechanisms of the object-redundant storage system in the key-durable storage system. In the example illustrated in FIG. 9, the operations shown as 950-965 may be repeated as needed in response to a loss of shards in either the object-redundant storage system or the key-durable storage system.

Note that the key-durable storage systems described herein may not support versioning. Therefore, if a new version of an object is created by a client, the client may store the new version of the object using the put object API described herein, and the new version of the object may be treated as an individual, independent object in the key-durable storage system. In such embodiments, the client may choose to delete the previous version of the object by sending an explicit request to do so (e.g., using a "delete object" API that includes the system-generated key for the previous version of the object).

Note that while in several examples included herein, the notification of one or more lost objects by a key-durable storage system is described in terms of a message (e.g., a unilateral message) that is sent from the key-durable storage system to a client, in other embodiments, the notification make take other forms. For example, in some embodiments, notifying a client that a stored object has been lost may include the key-durable storage system performing a write operation to a log that is configured to store such notifications or to a designated memory location that is accessible by the client. The information written by the write operation may include the respective key for the lost object. In such embodiments, the client (or a notification API thereof) may poll the log or designated memory location periodically (e.g., as part of a state or status gathering operation) to determine whether any objects that were stored on its behalf by the key-durable storage system have subsequently been lost. In response to receiving the notification (e.g., in response to determining that a notification has been written to the log or designated memory location), the client may take corrective action, as described herein. In other embodiments, a client may register or subscribe to a notification service provided by the key-durable storage system. In response to successfully registering or subscribing to the notification service, notifications may be provided to the client when any of the objects stored on its behalf are lost. In such embodiments, a module of the client application or a separate process operating on the client network may be invoked (e.g., it may be executed in the background and/or periodically invoked) that is configured to listen for and/or receive notification messages that are sent from the key-durable storage system to the client according to a notify API (such as the notify API described herein). In still other embodiments, a notification may take the form of an interrupt request that is sent by the key-durable storage system to the client. In response to the interrupt request, an interrupt handler of the client application (or another process executing on the client network) may examine the notification (e.g., to determine which object has been lost), and may perform or invoke a process to take appropriate corrective action.

A key-durable storage service (or a key-durable storage system configured to provide such a service) may be implemented on one or more computer systems that interact with each other to perform storing objects in a keymapless data store on behalf of storage service clients, generating keys for those objects, storing those generated keys in a durable manner, and notifying clients of any loss their data, according to various embodiments. One such computer system is illustrated by the block diagram in FIG. 10. In the illustrated embodiment, computer system 1000 includes multiple processors 1010 coupled to a system memory 1020 via an input/output (I/O) interface 1030. Computer system 1000 further includes a network interface 1040 coupled to I/O interface 1030, and one or more input/output devices 1050. In some embodiments, it is contemplated that a key-durable storage service (or underlying key-durable storage system) may be implemented using a single instance of computer system 1000, while in other embodiments multiple such systems, or multiple computing nodes making up computer system 1000, may be configured to host different portions or instances of a key-durable storage system or service, as described herein. For example, in some embodiments key-durable storage system may be implemented via one or more computing nodes of computer system 1000 that are distinct from the computing nodes implementing another key-durable storage system, or a subset of the volumes making up the data store of a key-durable storage system may be implemented via one or more computing nodes of computer system 1000 that are distinct from the computing nodes implementing another subset of the volumes making up the data store of a key-durable storage system. In other embodiments, a given computing node may implement the functionality of more than one key-durable storage system and/or the components thereof. In some embodiments, a key-durable storage system may be implemented via one or more computing nodes of computer system 1000 that are distinct from the computing nodes implementing an object-redundant storage system, as described herein.

In various embodiments computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory or non-transitory storage media. In the illustrated embodiment, program instructions and data implementing desired functions, such as those described above, are shown stored within system memory 1020 as program instructions 1025 and data storage 1035, respectively. In other embodiments, program instructions and/or data may be received, sent or stored upon different types of computer-accessible media (such as non-transitory, computer-readable storage media) or on similar media separate from system memory 1020 or computer system 1000. Generally speaking, a non-transitory, computer-readable medium may include storage media or memory media such as magnetic or optical media, (e.g., disk or CD/DVD-ROM) and may be coupled to computer system 1000 via I/O interface 1030. Program instructions and data stored on a non-transitory computer-readable storage medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 10:
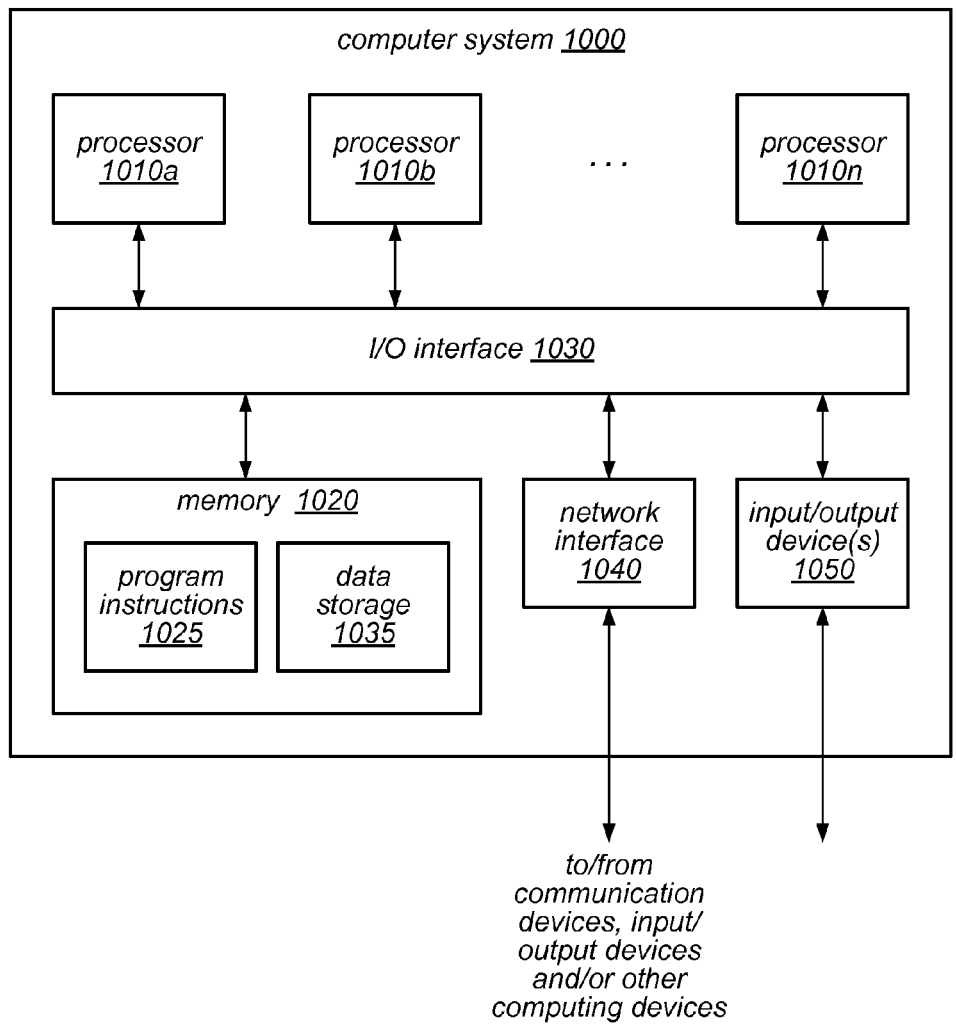
FIG. 10 is a block diagram illustrating one embodiment of a computer system configured to implement at least a portion of a key-durable storage service, as described herein.

As shown in FIG. 10, memory 1020 may include program instructions 1025, configured to implement a key-durable storage service (or an underlying key-durable storage system), and data storage 1035, comprising objects stored on behalf of storage service clients, key generated by the key-durable storage service and/or other types of data\and/or data structures accessible by program instructions 1025. In one embodiment, program instructions 1025 may include various software modules configured to interact with various data stores (such as those described herein) within data storage 1035 (e.g., to store and/or retrieve data from the data store). In various embodiments, program instructions 1025 may include software modules configured to implement any of the functionality described herein, including storing objects in a keymapless data store on behalf of storage service clients, generating keys for those objects, storing those generated keys in a durable manner, and notifying clients of any loss their data, according to various embodiments.

Data storage 1035 may include one or more volumes in which object data and keys may be stored for use in conjunction with the systems and methods described herein. For example, data storage 1035 may include multiple volumes, each of which includes a set of disks on which objects and keys may be stored by a key-durable storage service (or underlying key-durable storage system). In various embodiments, any or all of the data and/or keys described herein may be included in data storage 1035. In addition, any other data usable by program instructions 1025 when in performance of the techniques described herein may be included in data storage 1035 at various times.

In various embodiments, data stores used by a key-durable storage service (or underlying key-durable storage system), or portions thereof, may be physically located in one memory or may be distributed among two or more memories. These memories may be part of a single computer system or they may be distributed among two or more computer systems, such as two computer systems connected by a wired or wireless local area network, or through the Internet, in different embodiments. Similarly, in other embodiments, different software modules and data stores may implement various portions of a key-durable storage service (or underlying key-durable storage system), such as those described herein.

Users (e.g., users who are storage service clients) may interact with a key-durable storage service in various ways in different embodiments, such as to store or retrieve objects, or to receive information from the key-durable storage service about lost objects. For example, some users may have physical access to computing system 1000, and if so may interact with various input/output devices 1050 to provide information to and/or receive information from a key-durable storage system. Alternatively, other users may use client computing systems to access the key-durable storage service (or underlying key-durable storage system), such as remotely via network interface 1040 (e.g., via the Internet and/or the World Wide Web). In addition, some, or all, of the key-durable storage system components (or sub-modules) thereof may provide various feedback or other general types of information to users (e.g., in response to user requests) via one or more input/output devices 1050, or to client applications (e.g., through various APIs, as described herein).

Those skilled in the art will appreciate that computing system 1000 is merely illustrative and is not intended to limit the scope of embodiments. In particular, the computing system and devices may include any combination of hardware or software that can perform the indicated functions, including computers, network devices, internet appliances, PDAs, wireless phones, pagers, etc. Computing system 1000 may also be connected to other devices that are not illustrated, or instead may operate as a stand-alone system. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, different embodiments may be practiced with other computer system configurations.

Those skilled in the art will appreciate that in some embodiments the functionality provided by the methods discussed above may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. The various methods as illustrated in the figures and described herein represent exemplary embodiments of methods. The methods may be implemented in software, in hardware, or in a combination thereof in other embodiments. Similarly, the order of any method may be changed, and various elements may be added, reordered, combined, omitted, modified, etc., in other embodiments.

From the foregoing it will be appreciated that, although specific embodiments have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer accessible storage medium, other aspects may likewise be so embodied.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices each comprising at least one processor and memory, wherein the one or more computing devices implement an object-redundant storage service configured to redundantly store data objects such that for a given data object the object-redundant storage service stores a plurality of replicas or shards for the given data object, wherein the given data object is reconstructable from one or more of the replicas or shards; and
wherein at least one of the one or more computing devices or a different one or more computing devices implement a key-durable storage service;
wherein the object-redundant storage service is further configured, for each of one or more data objects stored in the object-redundant storage service, to store one or more respective replicas or shards to the key-durable storage service such that both the object-redundant storage service and the key-durable storage service store one or more replicas or shards for each of the one or more data objects stored in the object-redundant storage service;
wherein the key-durable storage service is configured to:
store each of the one or more replicas or shards for each of the one or more data objects as an independent data object with a given durability;
store a different respective key for each of the replicas or shards stored in the key-durable storage service, wherein the respective key is stored by the key-durable storage service with a higher durability than the corresponding replica or shard; and
return the respective keys to the object-redundant storage service, wherein each of the respective keys comprises information usable to retrieve the corresponding replica or shard from the key-durable storage service.

2. The system of claim 1, wherein, to store the respective key with a higher durability than the corresponding replica or shard, the key-durable storage service is configured to store multiple instances of the respective key, and wherein the number of instances is dependent on one or more of: a desired durability for the respective key, or an expected failure rate for storage nodes of the key-durable storage service.

3. The system of claim 1, wherein, for each of the one or more data objects stored in the object-redundant storage service, the one or more respective replicas or shards stored to the key-durable storage service comprises fewer than all of the plurality of replicas or shards for the given data object that are stored in the object-redundant storage service.

4. The system of claim 1, wherein the key-durable storage service does not maintain a data structure that maps each of the one or more replicas or shards for each of the one or more data objects or the respective keys to the locations at which the replicas or shards are stored in the key-durable storage service.

5. A method, comprising:
storing, by an object-redundant storage service implemented by one or more computers, a plurality of data objects, wherein storing the plurality of data objects comprises storing redundant object data for each of the plurality of data objects, and wherein each of the plurality of data objects is reconstructable from the redundant object data stored for the data object;
sending, by the object-redundant storage service, a request to a key-durable storage service to store at least a portion of the redundant object data for a given one of the of the plurality of data objects;
storing, by the key-durable storage service implemented by one or more computers, the at least a portion of the redundant object data for the given data object as one or more independent data objects, where each of the one or more independent data objects is stored with a given durability;
storing, by the key-durable storage service, a different respective key for each of the one or more independent data objects, wherein the respective key is stored with a higher durability than the corresponding independent data object, and wherein the respective key for each of the one or more independent data objects comprises an encoding usable to determine the location at which the independent data object is stored by the key-durable storage service; and
returning, by the key-durable storage service to the object-redundant storage service, the respective keys for each of the one or more independent data objects.

6. The method of claim 5, wherein the at least a portion of the redundant object data for the given data object comprises one or more replicas of the given data object.

7. The method of claim 5, wherein the at least a portion of the redundant object data for the given data object comprises one or more shards of the given data object that were created through erasure coding.

8. The method of claim 5,
wherein storing the at least a portion of the redundant object data for the given data object comprises storing a single instance of each of the one or more independent data objects; and
wherein storing the different respective key for each of the one or more independent data objects comprises storing multiple instances of each of the different respective keys.

9. The method of claim 5, further comprising:
generating, by the key-durable storage service, the different respective key for each of the one or more independent data objects.

10. The method of claim 5, wherein storing the different respective key for each of the one or more independent data objects comprises:
creating, by the key-durable storage service, a plurality of shards for each of the different respective keys through erasure coding; and
storing, by the key-durable storage service, each of the plurality of shards that were created for each of the different respective keys.

11. The method of claim 5, wherein, for each different respective key, the encoding represents an identifier of a storage volume on which the corresponding independent data object is stored by the key-durable storage service or an identifier of a disk on which the corresponding independent data object is stored by the key-durable storage service.

12. The method of claim 5, further comprising:
detecting, by the key-durable storage service, a loss of data in the key-durable storage service;
determining, in response to said detecting, that the lost data comprises one of the one or more independent data objects; and
returning, by the key-durable storage service to the object-redundant storage service, the respective key for the one of the one or more independent data objects.

13. A non-transitory, computer-readable storage medium storing program instructions that when executed on one or more computers cause the one or more computers to:

implement an object-redundant storage service on one or more devices on a service provider network, wherein the object-redundant storage service is configured to:
  store a plurality of data objects in a data store of the service provider network on behalf of one or more storage service clients, wherein for each of the plurality of data objects, the object-redundant storage service is configured to:
    create redundant object data for the data object comprising two or more redundant object data elements, wherein the data object is reconstructable from the redundant object data; and
    store at least a portion of the redundant object data in the data store;
  send to a key-durable storage service, in accordance with a put object application programming interface (API) exposed by the key-durable storage service for uploading data objects to the key-durable storage service by clients of the key-durable storage service, a request to store one or more of the two or more redundant object data elements for a given one of the plurality of data objects; and
  receive from the key-durable storage service, in accordance with a return object key API exposed by the key-durable storage service, a respective key for each of the one or more of the two or more redundant object data elements for the given data object, wherein the respective key comprises information usable to retrieve the corresponding one of the two or more redundant object data elements for the given data object from the key-durable storage service.

14. The non-transitory, computer-readable storage medium of claim 13, wherein the two or more redundant object data elements for the given data object comprise two or more replicas of the given data object.

15. The non-transitory, computer-readable storage medium of claim 13,
  wherein the object-redundant storage service is further configured to create a plurality of shards of the given data object through erasure coding; and
  wherein the two or more redundant object data elements for the given data object comprise two or more of the shards of the given data object.

16. The non-transitory, computer-readable storage medium of claim 15,
  wherein the object-redundant storage service is further configured to send to the key-durable storage service, in accordance with the put object API, one or more additional requests to store one or more other ones of the two or more redundant object data elements for the given data object, such that the ones of the two or more redundant object data elements for the given data object that are stored to the key-durable storage service by the object-redundant storage service comprise a subset of the two or more redundant object data elements for the given data object having a sufficient number of shards of the given data object to reconstruct the given data object.

17. The non-transitory, computer-readable storage medium of claim 15,
  wherein to store at least a portion of the redundant object data in the data store, the object-redundant storage service is configured store fewer than all of the two or more redundant object data elements for the given data object in the data store, wherein the ones of the two or more redundant object data elements for the given data object that are stored in the data store by the object-redundant storage service comprise a subset of the two or more redundant object data elements for the given data object having a sufficient number of shards of the given data object to reconstruct the given data object; and
  wherein the object-redundant storage service is further configured to send to the key-durable storage service, in accordance with the put object API, one or more additional requests to store one or more other ones of the two or more redundant object data elements for the given data object, such that the ones of the two or more redundant object data elements for the given data object that are stored to the key-durable storage service by the object-redundant storage service comprise a subset of the two or more redundant object data elements for the given data object comprising different ones of the two or more redundant object data elements for the given data object than those stored in the data store.

18. The non-transitory, computer-readable storage medium of claim 13,
  wherein the object-redundant storage service is further configured to send to the key-durable storage service, in accordance with the put object API, one or more additional requests to store one or more other ones of the two or more redundant object data elements for the given data object, such that all of the two or more redundant object data elements for the given data object are stored to the key-durable storage service by the object-redundant storage service.

19. The non-transitory, computer-readable storage medium of claim 13, wherein the object-redundant storage service is further configured to:
  send to the key-durable storage service, in accordance with a get object API exposed by the key-durable storage service for downloading data objects from the key-durable storage service by clients of the key-durable storage service, a request to retrieve one of the two or more redundant object data elements for the given data object, wherein the request comprises the respective key for the one of the two or more redundant object data elements for the given data object; and
  receive from the key-durable storage service, in accordance with a return object data API exposed by the key-durable storage service, the one of the two or more redundant object data elements for the given data object.

20. The non-transitory, computer-readable storage medium of claim 19,
  wherein the object-redundant storage service is further configured to:
    detect a data loss in the data store; and
    determine that the lost data comprises the one of the two or more redundant object data elements for the given data object; and
  wherein the object-redundant storage service is configured to send the request to retrieve the one of the two or more redundant object data elements for the given data object in response to determining that the lost data comprises the one of the two or more redundant object data elements for the given data object.

* * * * *